United States Patent
Jeong et al.

(10) Patent No.: US 11,971,650 B2
(45) Date of Patent: Apr. 30, 2024

(54) PRISM MODULE, CAMERA COMPRISING SAME, AND IMAGE DISPLAY DEVICE

(71) Applicant: LG ELECTRONICS INC., Seoul (KR)

(72) Inventors: Jongwoo Jeong, Seoul (KR); Hyungjoo Kang, Seoul (KR); Youngman Kwon, Seoul (KR); Dongryeol Lee, Seoul (KR); Jayong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 669 days.

(21) Appl. No.: 17/054,671

(22) PCT Filed: May 10, 2019

(86) PCT No.: PCT/KR2019/005612
§ 371 (c)(1),
(2) Date: Nov. 11, 2020

(87) PCT Pub. No.: WO2019/216681
PCT Pub. Date: Nov. 14, 2019

(65) Prior Publication Data
US 2021/0373282 A1    Dec. 2, 2021

(30) Foreign Application Priority Data

May 11, 2018  (KR) .................. 10-2018-0054544
May 9, 2019   (KR) .................. 10-2019-0054268

(51) Int. Cl.
*G02B 7/18*    (2021.01)
*G02B 7/09*    (2021.01)
(Continued)

(52) U.S. Cl.
CPC ............. *G03B 5/00* (2013.01); *G02B 7/09* (2013.01); *G02B 7/1805* (2013.01);
(Continued)

(58) Field of Classification Search
CPC ............ G03B 5/00; G03B 2205/0007; G03B 2205/003; G03B 2205/0069; G02B 7/09;
(Continued)

(56) References Cited

U.S. PATENT DOCUMENTS

2012/0194904 A1* 8/2012 Noguchi ............. G02B 27/646
                                                      359/416
2013/0278785 A1  10/2013 Nomura et al.
(Continued)

FOREIGN PATENT DOCUMENTS

JP    2013033179       2/2013
JP    2013238848 A *  11/2013  ......... G02B 13/0065
(Continued)

OTHER PUBLICATIONS

PCT International Application No. PCT/KR2019/005612, International Search Report dated Sep. 6, 2019, 3 pages.
(Continued)

*Primary Examiner* — George G. King
*Assistant Examiner* — Anna Smith
(74) *Attorney, Agent, or Firm* — LEE, HONG, DEGERMAN, KANG & WAIMEY

(57) ABSTRACT

The present invention relates to a prism module, a camera comprising same, and an image display device. A prism module, according to one embodiment of the present invention, comprises: a prism holder having a prism fixed to a first surface thereof; a yoke coupled to a second surface of the prism holder; a driving magnet seated on the yoke; a sensor magnet disposed on the yoke; a hall sensor disposed to be spaced apart from the sensor magnet; and a sensor magnet
(Continued)

support member to which the sensor magnet is attached. Thereby, it is possible to precisely detect a magnetic field.

20 Claims, 30 Drawing Sheets

(51) Int. Cl.
*G02B 13/00* (2006.01)
*G02B 26/08* (2006.01)
*G02B 27/64* (2006.01)
*G03B 5/00* (2021.01)
*G03B 13/36* (2021.01)
*H04N 23/67* (2023.01)
*H04N 23/68* (2023.01)
*G03B 13/32* (2021.01)

(52) U.S. Cl.
CPC ..... *G02B 13/0065* (2013.01); *G02B 26/0883* (2013.01); *G02B 27/646* (2013.01); *G03B 13/36* (2013.01); *H04N 23/67* (2023.01); *H04N 23/6812* (2023.01); *H04N 23/686* (2023.01); *G03B 13/32* (2013.01); *G03B 2205/0007* (2013.01); *G03B 2205/003* (2013.01); *G03B 2205/0069* (2013.01)

(58) Field of Classification Search
CPC .. G02B 7/1805; G02B 7/646; G02B 13/0065; G02B 13/36; G02B 13/32; G02B 26/0883; G02B 5/04; H04N 23/686; H04N 23/00

See application file for complete search history.

(56) References Cited

U.S. PATENT DOCUMENTS

2015/0110480 A1* 4/2015 Suzuka ................ G02B 27/646
                                                                     396/55
2018/0364494 A1* 12/2018 Masahiro ............... G03B 29/00

FOREIGN PATENT DOCUMENTS

| KR | 1020090124318 | 12/2009 | |
|---|---|---|---|
| KR | 1020150031046 | 3/2015 | |
| KR | 1020170023430 | 3/2017 | |
| KR | 1020170105236 | 9/2017 | |
| KR | 1020180003539 | 1/2018 | |
| WO | WO-2017111363 A1 * | 6/2017 | ............ G02B 27/64 |

OTHER PUBLICATIONS

Korean Intellectual Property Office Application No. 10-2019-0054268, Office Action dated Sep. 6, 2023, 5 pages.

* cited by examiner

PRISM MODULE, CAMERA COMPRISING SAME, AND IMAGE DISPLAY DEVICE

CROSS-REFERENCE TO RELATED APPLICATIONS

This application is the National Stage filing under 35 U.S.C. 371 of International Application No. PCT/KR2019/005612, filed on May 10, 2019, which claims the benefit of earlier filing date and right of priority to Korean Application Nos. 10-2018-0054544, filed on May 11, 2018, and 10-2019-0054268, filed on May 9, 2019, the contents of which are all hereby incorporated by reference herein their entirety.

BACKGROUND OF THE INVENTION

1. Field of the Disclosure

The present disclosure relates to a prism module, a camera, and an image display apparatus including the same and, more particularly, to a prism module, a camera, and an image display apparatus including the same that may detect magnetic field precisely.

2. Related Art

A camera is an apparatus for photographing an image. Recently, as the camera has been installed in a mobile terminal, researches on miniaturizing camera has been conducted.

Meanwhile, along with the trend of a miniaturized camera, an autofocusing function and an image stabilization function are increasingly employed.

Particularly, for the image stabilization function, it is important to detect a hand tremor motion precisely and compensate it.

SUMMARY

An object of the present disclosure is to provide a prism module, a camera and an image display apparatus including the same capable of detecting magnetic field precisely.

Another object of the present disclosure is to provide a prism module, a camera and an image display apparatus including the same capable of detecting magnetic field precisely and compensating magnetic field for an image stabilization, and accordingly, implement an image stabilization function.

Another object of the present disclosure is to provide a signal processing device capable of outputting first image frame data and second image frame data through the same transmission line and an image display apparatus including the same.

Another object of the present disclosure is to provide an image display apparatus capable of eliminating a memory in a timing controller.

Advantageous Effects

A prism module, a camera, and an image display apparatus including the same according to an embodiment of the present disclosure includes a prism holder for fixing a prism on a first surface, a yoke coupled to a second surface of the prism holder, a driving magnet seated on the yoke, a sensor magnet disposed on the yoke, a Hall sensor disposed with being spaced apart from the sensor magnet, and a sensor magnet supporting member to which the sensor magnet is attached. Accordingly, magnetic field may be detected precisely.

Meanwhile, the sensor magnet supporting member and the yoke contact with each other. Accordingly, magnetic field may be detected precisely.

Meanwhile, a first surface of the sensor magnet seated on the sensor magnet supporting member may be exposed outside. Accordingly, magnetic field may be detected precisely.

Meanwhile, a first surface and a second surface of the sensor magnet seated on the sensor magnet supporting member may be exposed outside. Accordingly, magnetic field may be detected precisely.

Meanwhile, the sensor magnet supporting member and the sensor magnet may contact the yoke. Accordingly, magnetic field may be detected precisely.

Meanwhile, it is preferable that a spacing between the sensor magnet and the Hall sensor is smaller than a width of the sensor magnet. Accordingly, magnetic field may be detected precisely.

Meanwhile, it is preferable that a width of the sensor magnet is greater than a width of the sensor magnet supporting member. Accordingly, magnetic field may be detected precisely.

Meanwhile, owing to the sensor magnet supporting member, a width or a size of the sensor magnet may be designed in small size in comparison with the conventional art, and a manufacturing cost of the sensor magnet may be reduced.

A camera, and an image display apparatus including the same according to an embodiment of the present disclosure includes an image sensor, a lens structure including at least one lens, wherein the lens is driven for variable focus, a first prism module including a first prism, and for changing an angle of the first prism in a first direction, and a second prism module including a second prism, and for changing an angle of the second prism in a second direction, wherein the first prism and the second prism are orthogonally disposed, and wherein the first prism or the second prism includes: a prism holder for fixing a prism on a first surface, a yoke coupled to a second surface of the prism holder, a driving magnet seated on the yoke, a sensor magnet disposed on the yoke, a Hall sensor disposed with being spaced apart from the sensor magnet, and a sensor magnet supporting member to which the sensor magnet is attached. Accordingly, for a hand tremor prevention, magnetic field may be detected precisely, and compensated, and accordingly, a image stabilization function may be implemented.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF EXEMPLARY EMBODIMENTS

Hereinafter, the present invention will be described in detail with reference to the accompanying drawings. With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1A:
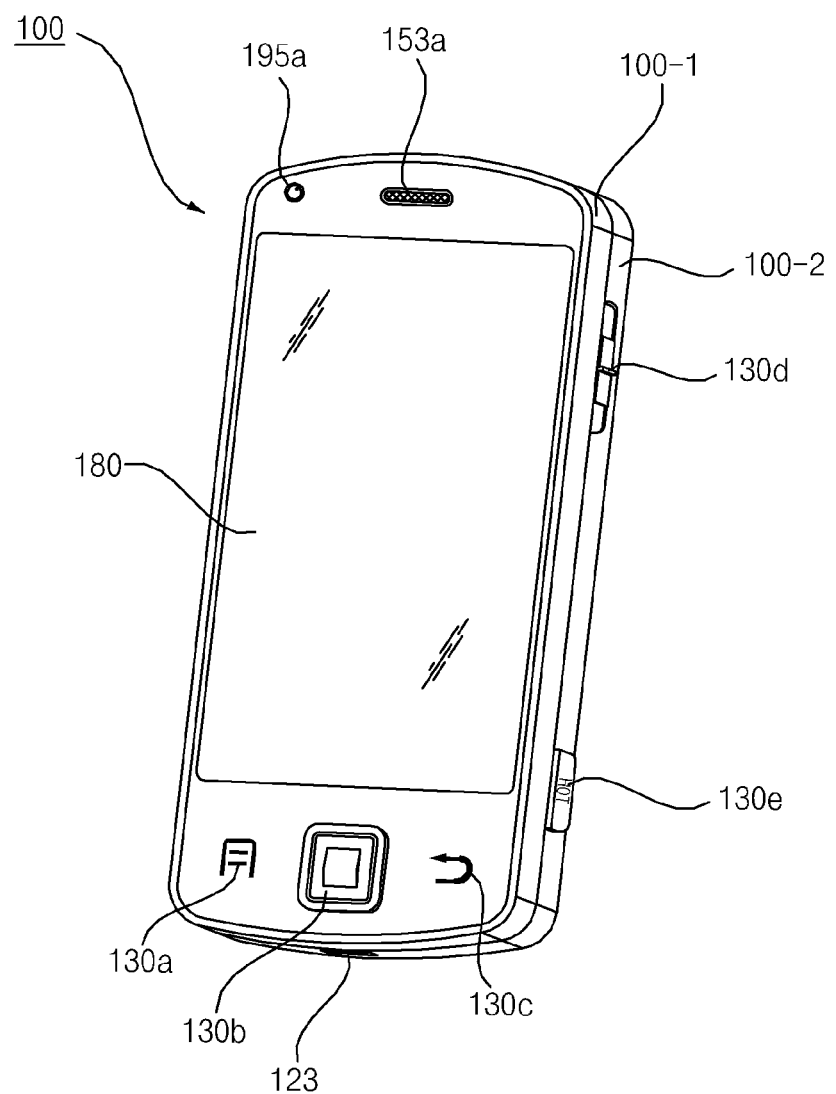
FIG. 1A is a perspective view of a mobile terminal as an example of an image display apparatus according to an embodiment of the present invention.
Figure 1B:
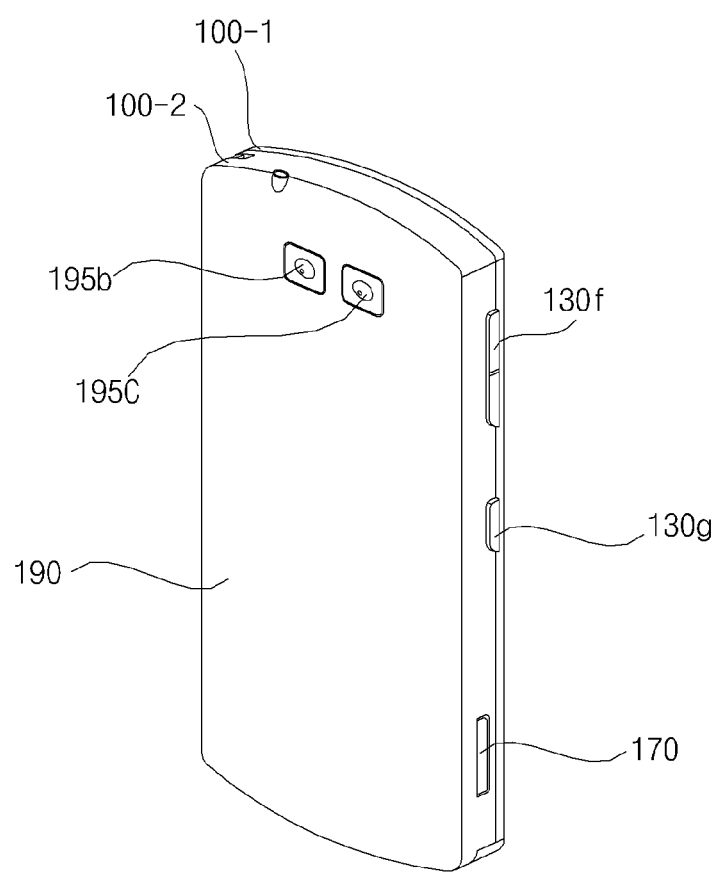
FIG. 1B is a rear perspective view of the mobile terminal shown in FIG. 1A.

FIG. 1A is a perspective view of a mobile terminal as an example of an image display apparatus according to an embodiment of the present invention, and FIG. 1B is a rear perspective view of the mobile terminal shown in FIG. 1A.

Referring to FIG. 1A, a case forming an outer appearance of a mobile terminal 100 may be formed by a front case 100-1 and a rear case 100-2. Various electronic components may be embedded in a space formed by the front case 100-1 and the rear case 100-2.

Specifically, a display 180, a first sound output module 153a, a first camera 195a, and a first to third user input units 130a, 130b, and 130c may be disposed in the front case 100-1. Further, a fourth user input unit 130d, a fifth user input unit 130e, and a first to third microphones 123a, 123b, and 123c may be disposed on a lateral surface of the rear case 100-2.

In the display 180, a touchpad may be overlapped in a layer structure so that the display 180 may operate as a touch screen.

The first sound output module 153a may be implemented in the form of a receiver or a speaker. The first camera 195a may be implemented in a form suitable for photographing an image or a moving image of a user, and the like. The microphone 123 may be implemented in a form suitable for receiving a user's voice, other sounds, and the like.

The first to fifth user input units 130a, 130b, 130c, 130d and 130e and the sixth and seventh user input units 130f and 130g described below may be collectively referred to as a user input unit 130.

The first microphone 123a and the second microphone 123b may be disposed in the upper side of the rear case 100-2, i.e., in the upper side of the mobile terminal 100, so as to collect an audio signal, and the third microphone 123c may be disposed in the lower side of the rear case 100-2, i.e., in the lower side of the mobile terminal 100, so as to collect an audio signal Referring to FIG. 1B, a second camera 195b, a third camera 195c, and a fourth microphone 123d may be additionally mounted on the rear surface of the rear case 100-2, and a sixth and seventh user input units 130f and 130g, and an interface 175 may be disposed on the side surface of the rear case 100-2.

The second camera 195b has a photographing direction substantially opposite to that of the first camera 195a, and may have different pixels from the first camera 195a. A flash (not shown) and a mirror (not shown) may be additionally disposed adjacent to the second camera 195b. In addition, another camera may be installed adjacent to the second camera 195b to be used for shooting a three-dimensional stereoscopic image.

The second camera 195b may have a photographing direction substantially opposite to that of the first camera 195a, and may have different pixels from the first camera 195a. A flash (not shown) and a mirror (not shown) may be additionally disposed adjacent to the second camera 195b. In addition, another camera may be installed adjacent to the second camera 195b to be used for photographing a three-dimensional stereoscopic image.

A second sound output module (not shown) may be additionally disposed in the rear case 100-2. The second sound output module may implement a stereo function together with the first sound output module 153a, and may be used for talking in a speakerphone mode.

A power supply unit 190 for supplying power to the mobile terminal 100 may be mounted in the rear case 100-2. The power supply unit 190 may be, for example, a rechargeable battery and may be detachably coupled to the rear case 100-2 for charging or the like.

The fourth microphone 123d may be disposed in the front surface of the rear case 100-2, i.e., in the rear surface of the mobile terminal 100 so as to collect an audio signal.

Figure 2:
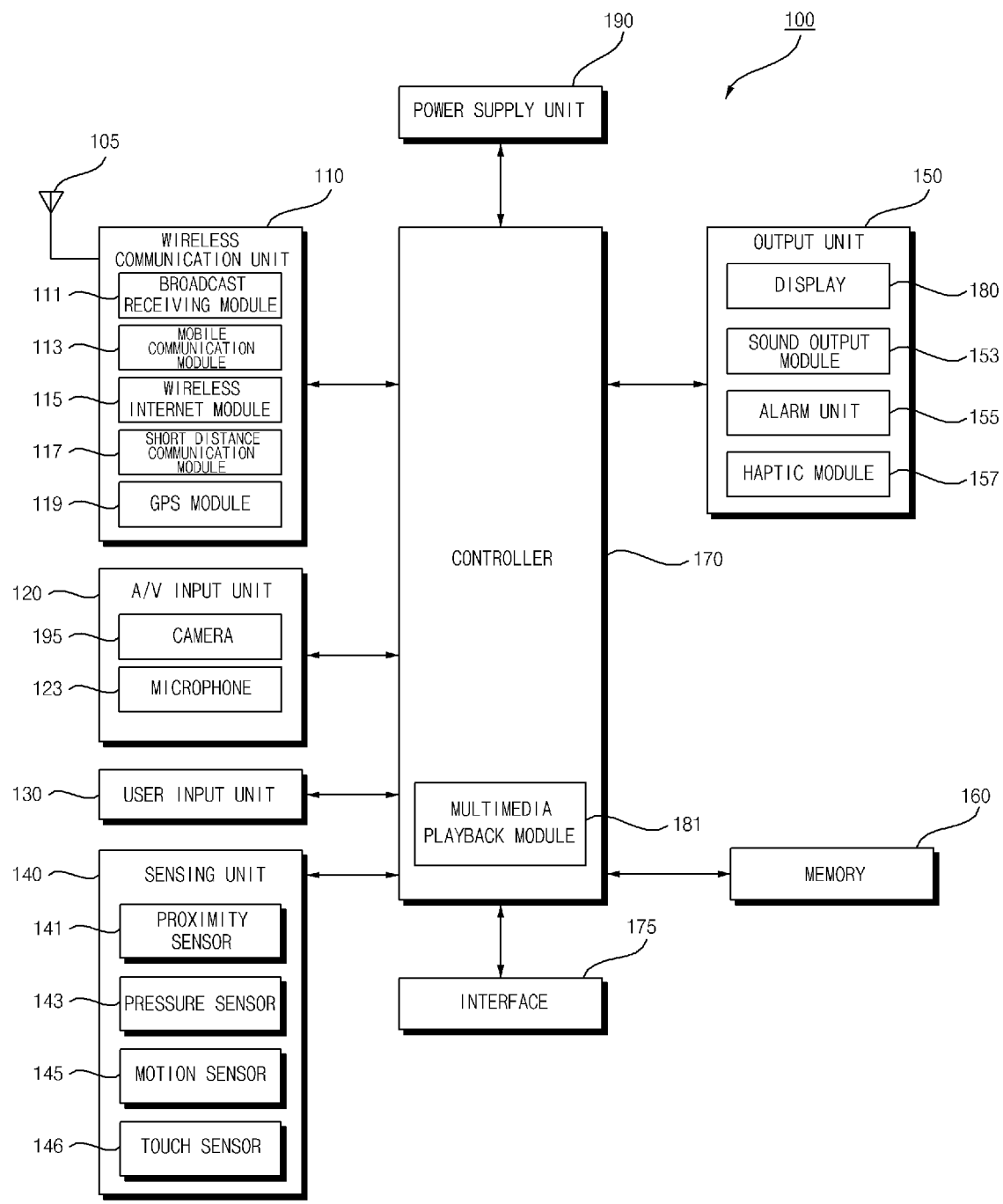
FIG. 2 is a block diagram of the mobile terminal of FIG. 1.

FIG. 2 is a block diagram of the mobile terminal of FIG. 1.

Referring to FIG. 2, the mobile terminal 100 may include a wireless communication unit 110, an audio/video (A/V) input unit 120, a user input unit 130, a sensing unit 140, an output unit 150, a memory 160, an interface 175, a controller 170, and a power supply unit 190. When these components are implemented in an actual application, two or more components may be combined into one component if necessary, or one component may be divided into two or more components.

The wireless communication unit 110 may include a broadcast receiving module 111, a mobile communication module 113, a wireless Internet module 115, a short-range communication module 117, and a GPS module 119.

The broadcast receiving module 111 may receive at least one of a broadcast signal and broadcast related information from an external broadcast management server through a broadcast channel. The broadcast signal and/or broadcast related information received through the broadcast receiving module 111 may be stored in the memory 160.

The mobile communication module 113 may transmit and receive a wireless signal to at least one of a base station, an external terminal, and a server on a mobile communication network. Here, the wireless signal may include various types of data in accordance with a voice call signal, a video call signal, or a character/multimedia message transmission/reception.

The wireless Internet module 115 refers to a module for wireless Internet access, and the wireless Internet module 115 may be embedded in the mobile terminal 100 or externally provided.

The short-range communication module 117 refers to a module for short-range communication. Bluetooth, Radio Frequency Identification (RFID), infrared Data Association (IrDA), Ultra Wideband (UWB), ZigBee, and Near Field Communication (NFC) may be used as a short-range communication technology.

The Global Position System (GPS) module 119 may receive position information from a plurality of GPS satellites.

The audio/video (A/V) input unit 120 may be used to input an audio signal or a video signal, and may include the camera 195, the microphone 123, and the like.

The camera 195 may process an image frame such as a still image or a moving image obtained by an image sensor in a video call mode or a photographing mode. Then, the processed image frame may be displayed on the display 180.

The image frame processed by the camera 195 may be stored in the memory 160 or transmitted to the outside through the wireless communication unit 110. Two or more cameras 195 may be provided according to the configuration of the terminal.

The microphone 123 may receive an external audio signal by the microphone in a display off mode, e.g., a call mode, a recording mode, or a voice recognition mode, and may process the audio signal into an electrical voice data.

Meanwhile, a plurality of microphones 123 may be disposed in different positions. The audio signal received in each microphone may be audio-signal processed in the controller 170, or the like.

The user input unit 130 may generate key input data that the user inputs for controlling the operation of the terminal. The user input unit 130 may include a key pad, a dome switch, and a touch pad (static pressure scheme/capacitive scheme) capable of receiving a command or information by a user's pressing or touching operation. In particular, when the touch pad has a mutual layer structure with the display 180 described later, it may be referred to as a touch screen.

The sensing unit 140 may detect the current state of the mobile terminal 100 such as the open/close state of the mobile terminal 100, the position of the mobile terminal 100, the contact of the user, and the like, and may generate a sensing signal for controlling the operation of the mobile terminal 100.

The sensing unit 140 may include a proximity sensor 141, a pressure sensor 143, a motion sensor 145, a touch sensor 146, and the like.

The proximity sensor 141 may detect an object approaching the mobile terminal 100 or an object in the vicinity of the mobile terminal 100 without mechanical contact. In particular, the proximity sensor 141 may detect a nearby object by using a change in the alternating magnetic field or a change in the static magnetic field, or by using a change rate of the capacitance.

The pressure sensor 143 may detect whether a pressure is applied to the mobile terminal 100, or detect the magnitude of the pressure, and the like.

The motion sensor 145 may detect the position or motion of the mobile terminal 100 by using an acceleration sensor, a gyro sensor, or the like.

The touch sensor 146 may detect a touch input by a user's finger or a touch input by a specific pen. For example, when a touch screen panel is disposed on the display 180, the touch screen panel may include a touch sensor 146 for detecting position information and intensity information of the touch input. A sensing signal detected by the touch sensor 146 may be transmitted to the controller 180.

The output unit 150 may be used to output an audio signal, a video signal, or an alarm signal. The output unit 150 may include a display 180, an sound output module 153, an alarm unit 155, and a haptic module 157.

The display 180 may display and output information processed by the mobile terminal 100. For example, when the mobile terminal 100 is in the call mode, a user interface (UI) or graphic user interface (GUI) related with the call may be displayed. When the mobile terminal 100 is in the video call mode or the photographing mode, the photographed or received image may be displayed individually or simultaneously, and the UI and the GUI may be displayed.

Meanwhile, as described above, when the display 180 and the touch pad form a mutual layer structure to constitute a touch screen, the display 180 may be used as an input apparatus capable of inputting information by a user's touch in addition to an output apparatus.

The sound output module 153 may output the audio data received from the wireless communication unit 110 or stored in the memory 160 in a call signal reception, a call mode or a recording mode, a voice recognition mode, a broadcast reception mode, and the like. The sound output module 153 may output an audio signal related to the function performed in the mobile terminal 100, e.g., a call signal reception tone, a message reception tone, and the like. The sound output module 153 may include a speaker, a buzzer, and the like.

The alarm unit 155 may output a signal for notifying the occurrence of an event of the mobile terminal 100. The alarm unit 155 may output a signal for notifying the occurrence of an event in a form other than an audio signal or a video signal. For example, it is possible to output a signal in a form of vibration.

The haptic module 157 may generate various tactile effects that the user can feel. A typical example of the tactile effect generated by the haptic module 157 may be a vibration effect. When the haptic module 157 generates vibration with a tactile effect, the intensity and pattern of the vibration generated by the haptic module 157 can be converted, and different vibrations may be synthesized and outputted or sequentially outputted.

The memory 160 may store a program for the processing and controlling of the controller 170, and may serve to temporarily store inputted or outputted data (e.g., a phone book, a message, a still image, a moving image, or the like).

The interface 175 may serve as an interface with all external devices connected to the mobile terminal 100. The interface 175 may receive data from an external device or receive power from the external device to transmit to each component in the mobile terminal 100, and allow the data in the mobile terminal 100 to be transmitted to the external device.

The controller 170 may control, in general, the operation of each unit to control the overall operation of the mobile terminal 100. For example, the controller 170 may perform relevant control and processing for voice call, data communication, video call, and the like. In addition, the controller 170 may include a multimedia play module 181 for playing multimedia. The multimedia play module 181 may be configured in hardware inside the controller 170 or may be configured in software separately from the controller 170.

Meanwhile, the controller 170 may include an application processor (not shown) for driving an application. Alternatively, the application processor (not shown) may be provided separately from the controller 170.

The power supply unit 190 may receive external power or internal power under the control of the controller 170 to supply power required for operation of each component.

Figure 3A:
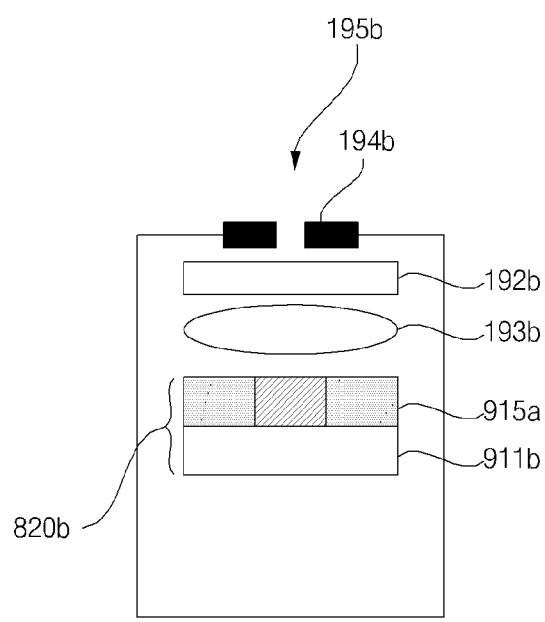
FIG. 3A is an internal cross-sectional view of the camera of FIG. 2.

FIG. 3A is an internal cross-sectional view of the camera of FIG. 2.

Referring to the drawing, FIG. 3A is an example of a cross-sectional view of a second camera 195b inside the camera 195.

The second camera 195b may include an aperture 194b, a dual prism structure 192b, a lens structure 193b and an image sensor 820b.

The aperture 194b may open and close the light incident on the lens structure 193b.

The image sensor 820b may include an RGB filter 915b, and a sensor array 911b for converting an optical signal into an electric signal, in order to sense RGB colors.

Accordingly, the image sensor 820b may sense and output RGB images, respectively.

Figure 3B:
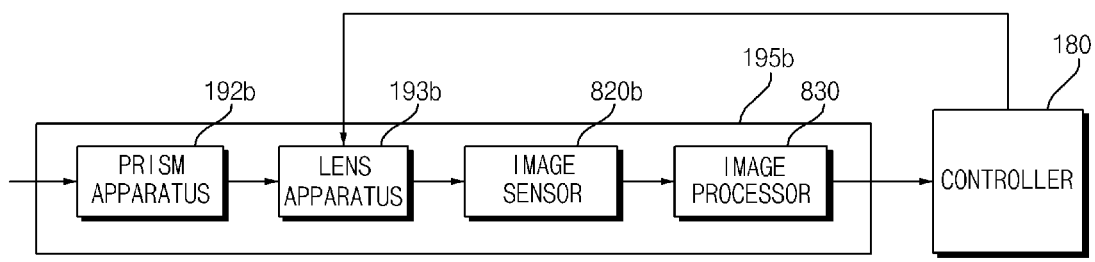
FIG. 3B is an internal block diagram of the camera of FIG. 2.

FIG. 3B is an internal block diagram of the camera shown in FIG. 2.

Referring to the drawing, FIG. 3B shows an example of a block diagram of the second camera 195b in the camera 195.

The second camera 195b may include the dual prism structure 192b, the lens structure 193b, the image sensor 820b and an image processor 830.

The image processor 830 may generate an RGB image based on an electric signal from the image sensor 820b.

Meanwhile, the image sensor 820b may adjust an exposure time based on the electric signal.

Meanwhile, the RGB image generated by the image processor 830 may be transferred to the controller 170 of the mobile terminal 100.

Meanwhile, the controller 170 of the mobile terminal 100 may output a control signal to the lens structure 193b for movement of a lens in the lens structure 193b. For example, a control signal for autofocusing may be output to the lens structure 193b.

Meanwhile, the controller 170 of the mobile terminal 100 may output a control signal for an image stabilization function in the dual prism structure 192b to the dual prism structure 192b.

Figure 3C:
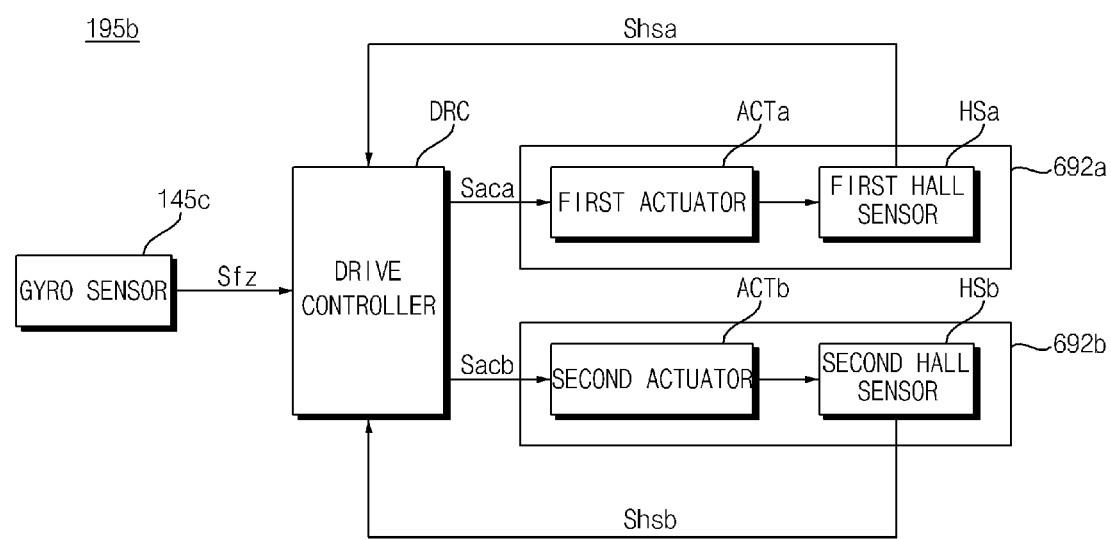
FIGS. 3C and 3D illustrate various examples of an internal block diagram of the camera shown in FIG. 2.
Figure 3D:
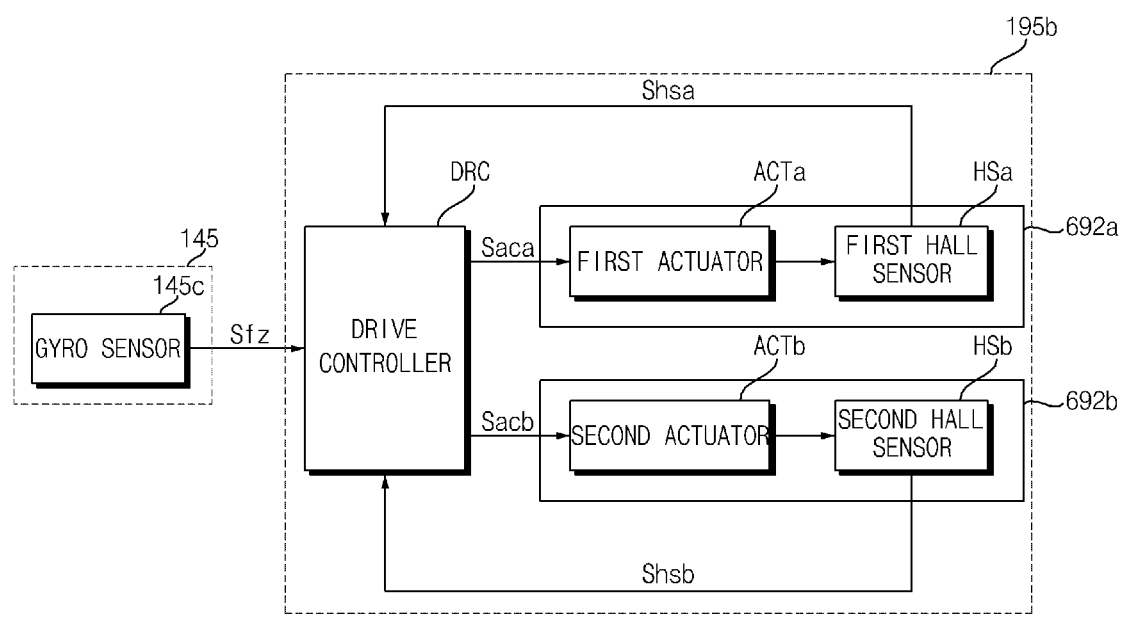

FIGS. 3C and 3D illustrate various examples of an internal block diagram of the camera shown in FIG. 2.

First, FIG. 3C illustrates a gyro sensor 145c, a driving controller DRC, a first prism module 692a and a second prism module 692b, which are included in the camera 195b.

The gyro sensor 145c may detect a first directional motion and a second directional motion. In addition, the gyro sensor 145c may output motion information Sfz including the first directional motion and the second directional motion.

The driving controller DRC may output control signals Saca and Sacb for motion compensation based on the motion information Sfz including the first directional motion and the second directional motion to the first prism module 692a and the second prism module 692b, respectively.

Particularly, the driving controller DRC may output control signals to a first actuator ACTa and a second actuator ACTb in the first directional motion and the second directional motion to the first prism module 692a, respectively.

The first control signal Saca may be a control signal for a first directional motion compensation detected in the gyro sensor 145c, and the second control signal Sacb may be a control signal for a second directional motion compensation detected in the gyro sensor 145c.

The first actuator ACTa, based on the first control signal Saca, may change an angle of a first prism PSMa along a first rotational axis.

The second actuator ACTb, based on the second control signal Sacb, may change an angle of a second prism PSMb along a second rotational axis.

Meanwhile, a first Hall sensor HSa and a second Hall sensor HSb in the first prism PSMa and the second prism PSMb may sense magnetic field changes according to the movements of the first prism PSMa and the second prism PSMb, respectively, in order to check movement information.

Particularly, the first Hall sensor HSa detects an angle change of the first prism PSMa based on first magnetic field, and the second Hall sensor HSb detects an angle change of the first prism PSMa based on second magnetic field.

Furthermore, the motion information detected by the first Hall sensor HSa and the second Hall sensor HSb, particularly, first and second magnetic field change information Shsa and Shsb may be input to the driving controller DRC.

The driving controller DRC may perform PI control and the like based on the control signal Saca and Sacb for motion compensation and the motion information, particularly, the first and second magnetic field change information Shsa and Shsb, and accordingly, may control motions of the first prism PSMa and the second prism PSMb precisely.

That is, the driving controller DRC may receive the information Shsa and Shsb detected by the first Hall sensor HSa and the second Hall sensor HSb and may perform a closed loop control, and accordingly, may control motions of the first prism PSMa and the second prism PSMb precisely.

Next, FIG. 3D is similar to FIG. 3C, but there is a difference in that the gyro sensor 145c is included in the motion sensor 145 in the separate sensing unit 140 in the mobile terminal 100, not inside of the camera 195b.

Accordingly, although it is not shown in FIG. 3D, the camera 195b shown in FIG. 3D may further include an interface unit (not shown) for receiving a signal from the external gyro sensor 145c.

Meanwhile, the motion information Sfz including the first directional motion and the second directional motion received from the gyro sensor 145c is input to the driving controller DRC. The operation of the driving controller DRC may be the same as the description of FIG. 3C.

Figure 4A:
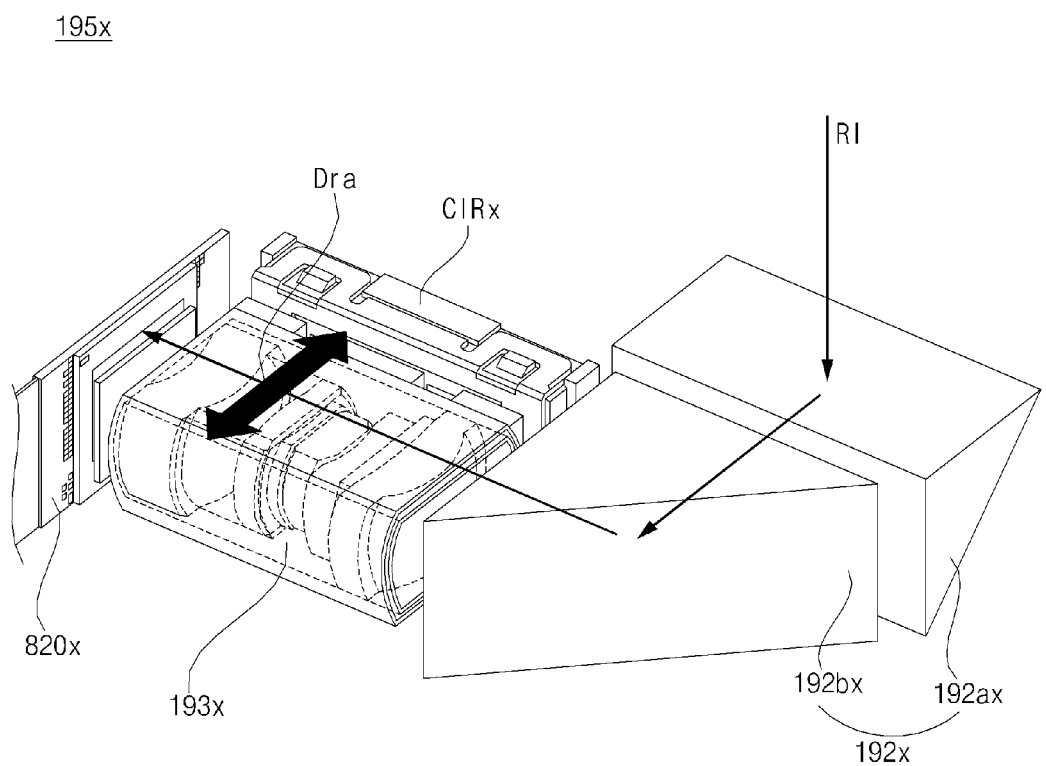
FIG. 4A is a diagram illustrating a camera of a dual prism structure.

FIG. 4A is a diagram illustrating a camera of a dual prism structure.

FIG. 4A illustrates that a camera 195x includes an image sensor 820x, a lens structure 193x for transferring light to the image sensor, a lens driver CIRx for moving a lens in the lens structure 193x and a dual prism structure 192x provided with a first prism 192ax and a second prism 192bx.

The camera 195x of FIG. 4A may perform a movement of the lens structure 193x for preventing a hand tremor. The drawing illustrates that a compensation is performed in a Dra direction.

According to the scheme, there is a disadvantage that more hand tremor compensation should be performed in the case that an optical zoom is in a high magnification state. Therefore, an accuracy of the hand tremor compensation is degraded.

In addition, in the case of the scheme, a lens movement direction needs to cross the Dra direction, and accordingly, there is a disadvantage that it is hard to implement a lens movement and a movement for preventing a hand tremor simultaneously.

According to the present disclosure, in order to supplement the disadvantage, a hand tremor compensation is implemented in a prism module, and particularly, an angle compensation is performed by using a rotational actuator. According to this, with the performance of the angle compensation, there is an advantage that an angle within a predetermined range only needs to be compensated without regard to the case that the optical zoom of the lens structure 193x is in low magnification or high magnification state. For example, by using a plurality of prism modules, in respective first and second rotational directions, a first angle may be compensated. Accordingly, without regard to an optical zoom, an angle compensation within a predetermined range becomes available, and therefore, an accuracy of the hand tremor compensation is improved. This is described with reference to FIG. 5A below.

Figure 4B:
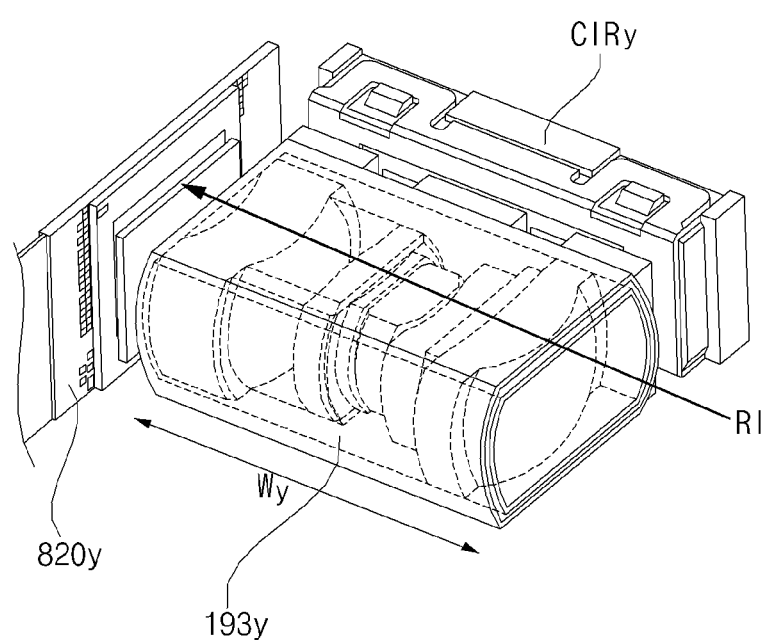
FIGS. 4B and 4C are diagrams illustrating a camera of which a dual prism structure is omitted.
Figure 4C:
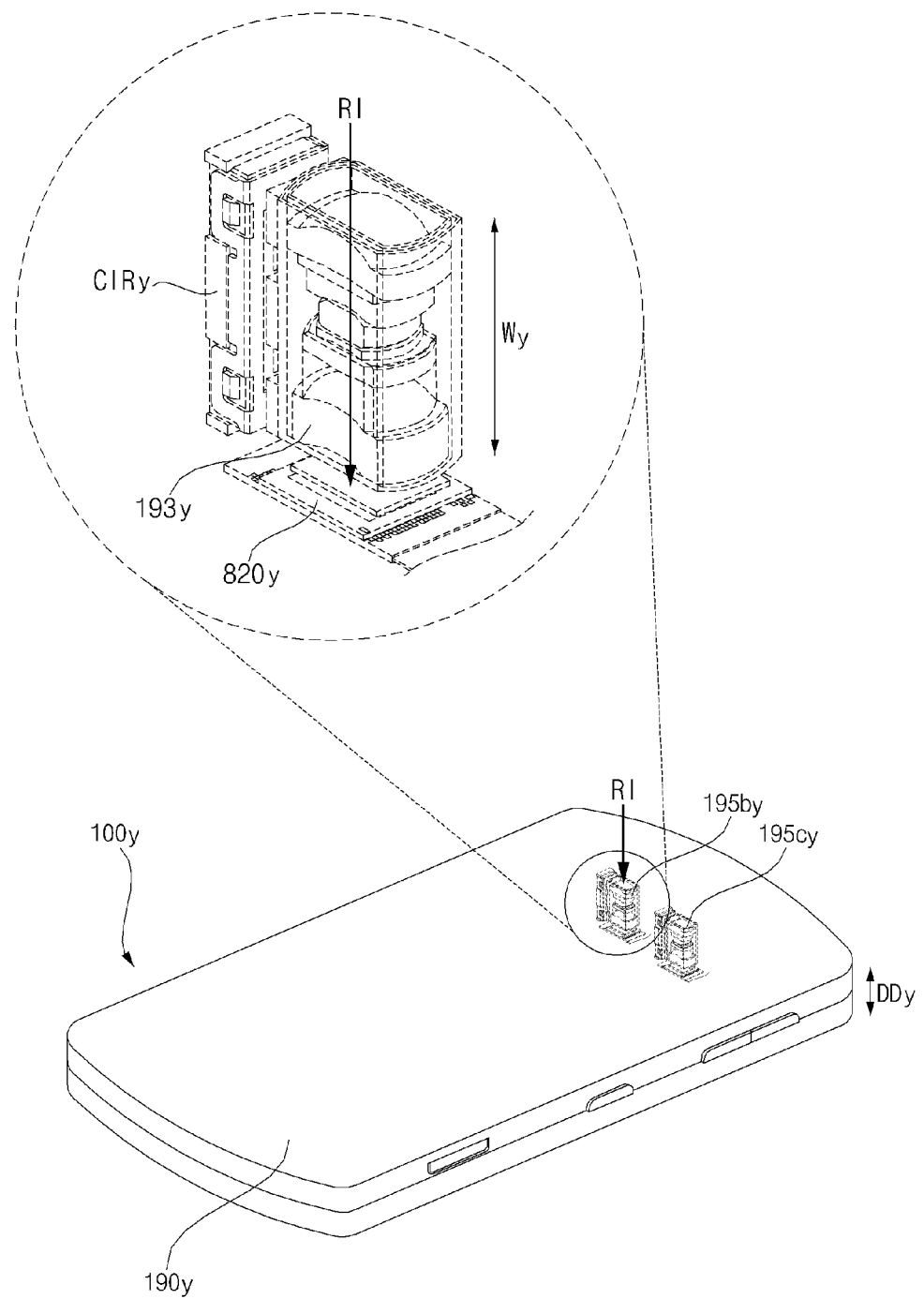

FIGS. 4B and 4C are diagrams illustrating a camera of which a dual prism structure is omitted.

FIG. 4B illustrates that a camera 195y includes an image sensor 820y, a lens structure 193y for transferring light to the image sensor and a lens driver CIRy for moving a lens in the lens structure 193y.

Meanwhile, according to the camera 195y of FIG. 4B, since a plurality of prism structure is not included, the incident light RI is input through the lens structure 193y directly, and accordingly, the lens structure 193y and the image sensor 820y need to be arranged vertically with respect to the incident light RI.

That is, in a mobile terminal 100y shown in FIG. 4C, the incident light RI is transferred to the image sensor 820y via the lens structure 193y.

Recently, with the tendency of high image quality and high performance, a length Wy of the lens structure 193y is elongated. According to the structure, there is a disadvantage that as the length Wy of the lens structure 193y increases, a thickness DDy of the mobile terminal 100y becomes thicker.

Accordingly, in the present disclosure, in order to solve it, a dual prism is adopted, and a first prism and a second prism are arranged to cross with each other such that light paths RI of the first prism and the second prism are different. According to the structure, an implementation of L-shaped camera is available, and therefore, a slim camera of which thickness becomes thinner can be implemented. This is described with reference to FIG. 5A below.

Figure 5A:
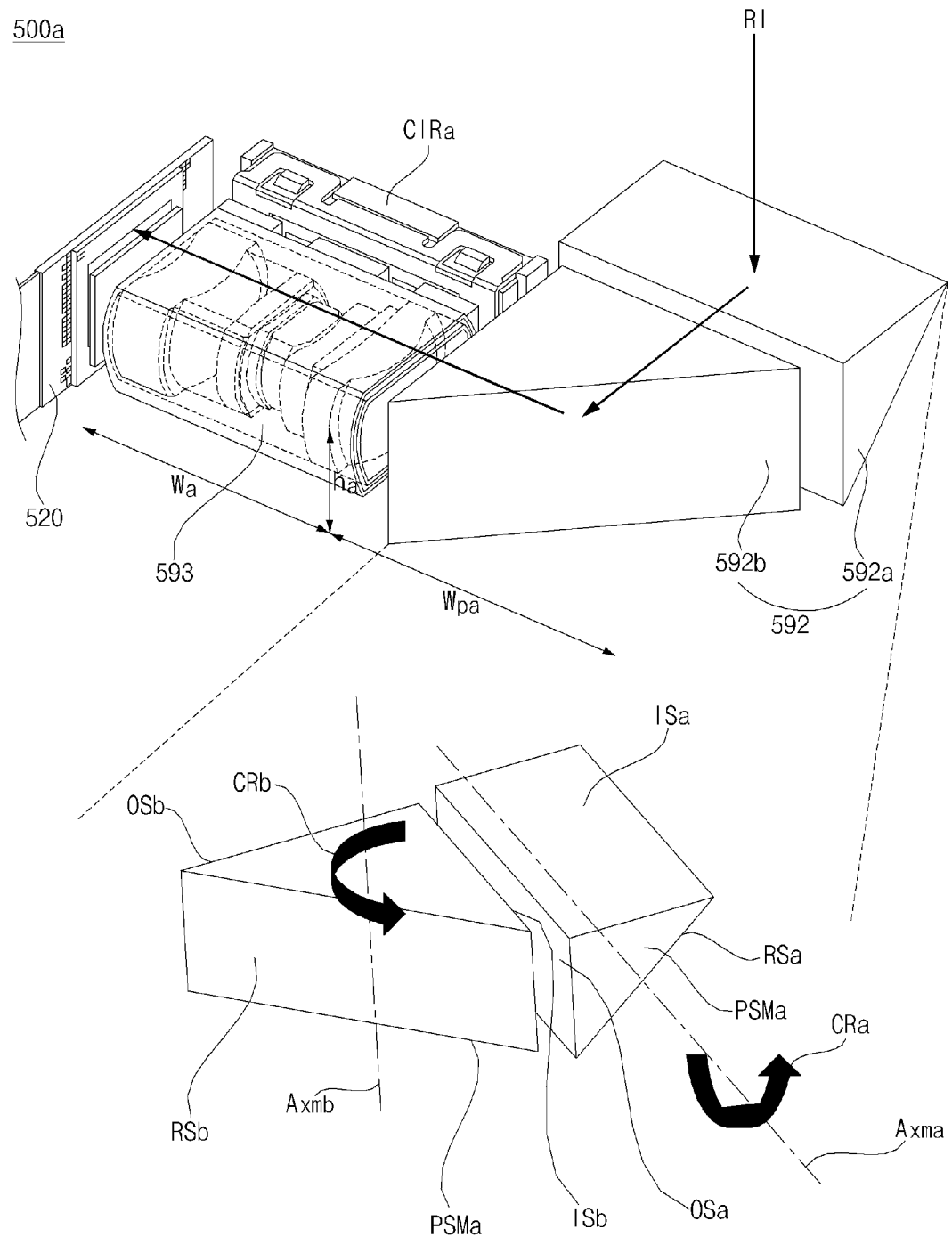
FIG. 5A is a diagram illustrating an example of a camera including a rotatable dual prism module according to an embodiment of the present disclosure.
Figure 5B:
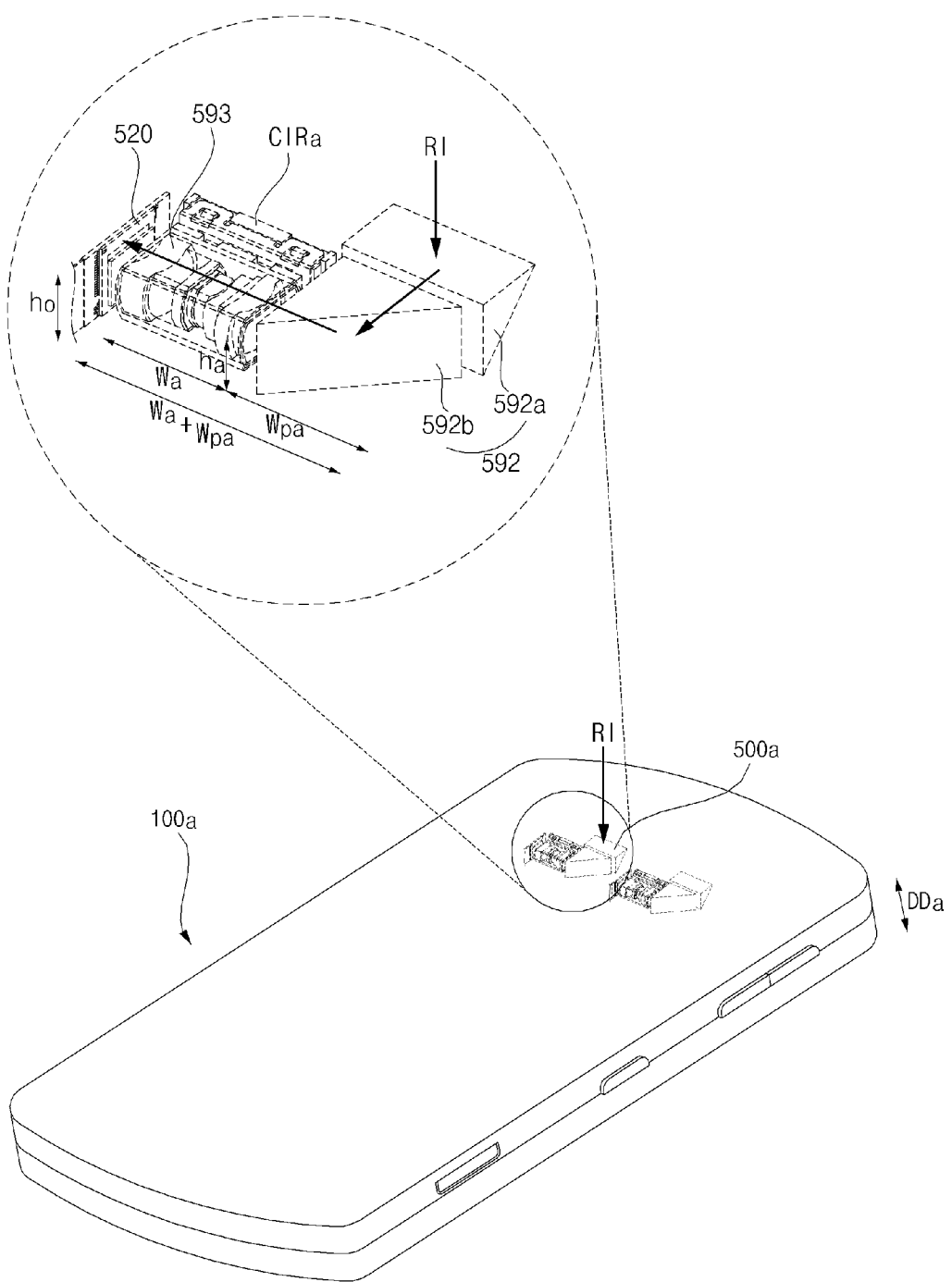
FIG. 5B is a diagram illustrating a mobile terminal including the camera of FIG. 5A.

FIG. 5A is a diagram illustrating an example of a camera including a rotatable dual prism module according to an embodiment of the present disclosure, and FIG. 5B is a diagram illustrating a mobile terminal including the camera of FIG. 5A.

FIG. 5A illustrates that a camera 500a includes an image sensor 520, a lens structure 593 for transferring light to the image sensor 520 and a dual prism structure 592 provided with a first prism module 592a and a second prism module 592b.

Different from FIG. 4A, the dual prism structure 592 rotates in order to implement a image stabilization function.

Meanwhile, different from FIG. 4A, since the lens structure 593 is not implemented with the image stabilization function, the lens structure 593 may be implemented to be slimmer.

The lens structure 593 may include at least one lens, and the lens may be moved for variable focus.

For example, the lens structure 593 may include a plurality of lenses such as a concave lens and a convex lens and may move at least one internal lens for variable focus based on a control signal from the image processor 830 or the controller 170. Particularly, the lens structure 593 may move the lens toward the image sensor 820b or to opposite direction of the image sensor 820b.

Meanwhile, FIG. 5A illustrates the arrangement in the order of the image sensor 520, the lens structure 593 and the dual prism structure 592 and that the light incident to the dual prism structure 592 is transferred to the lens structure 593 and image sensor 520. But a modification from it is available.

Particularly, the light from upper side is reflected on a first internal reflection surface RSa of a first prism PSMa in the first prism module 592a and transferred to the second prism module 592b, and then, reflected on a second internal reflection surface RSb of a second prism PSMb in the second prism module 592b and transferred to the image sensor 520.

That is, different from FIG. 5A, it is shown the order of the image sensor 520, the dual prism structure 592 and the lens structure 593 and that the light incident to the lens structure 593 is transferred to the dual prism structure 592 and image sensor 520.

The dual prism structure 592 may include a first prism PSMa for reflecting an incident light in a first reflection direction, a first actuator ACTa for changing the first reflection direction by changing an angle of the first prism PSMa around a first rotational axis Axma based on a first control signal Saca, a second prism PSMb for reflecting the light reflected by the first prism PSMa to a second reflection direction and a second actuator ACTb for changing the second reflection direction by changing an angle of the second prism PSMb around a second rotational axis Axmb based on an input second control signal Sacb.

The first prism PSMa includes a first internal reflection surface RSa, and the second prism PSMb includes a second internal reflection surface.

Meanwhile, the first prism PSMa receives an incident light through a first incident prism surface ISA and outputs a reflected incident light from the first internal reflection surface RSa through a first output prism surface OSa. The second prism PSMb receives a reflected incident light through a second incident prism surface ISb and outputs a reflected light reflected from the second internal reflection surface RSb.

Meanwhile, the first output prism surface OSa of the first prism PSMa faces the second incident prism surface ISb of the second prism PSMb.

Meanwhile, the first rotational axis Axma of the first prism PSMa is orthogonal to the second rotational axis Axmb of the second prism PSMb.

In this case, it is preferable that the first prism PSMa and the second prism PSMb are disposed to intersect with each other. Particularly, it is preferable that the first prism PSMa and the second prism PSMb are orthogonally disposed.

Meanwhile, the refractive indices of the first prism PSMa and the second prism PSMb may be 1.7 or greater. Accordingly, total reflection may be performed in the first prism PSMa and the second prism PSMb, and consequently, light RI may be transferred to the image sensor direction.

Meanwhile, the refractive indices of the first prism PSMa and the second prism PSMb may be less than 1.7, and reflective coatings may be formed on the reflection surfaces of the respective first prism PSMa and the second prism PSMb. Accordingly, total reflection may be performed in the first prism PSMa and the second prism PSMb, and consequently, light RI may be transferred to the image sensor direction.

Accordingly, the image sensor 520, the lens structure 593 and the first prism module 592a may be disposed in one direction side by side, but the second prism module 592b may be disposed to intersect with the first prism module 592a.

Accordingly, the first prism module 592a and the second prism module 592b may be referred to as the L-shaped dual prism structure 592. In addition, such a camera 500a structure may be referred to as the L-shaped type camera.

According to the structure, the first prism module 592a and the second prism module 592b may perform an angle compensation by rotating in a first direction CRa, for example, counter clockwise direction ccw based on the first rotational axis Axma and by rotating in a second direction CRb, for example, counter clockwise direction ccw based on the second rotational axis Axmb, and therefore, may implement the image stabilization function.

For example, in response to the motion that the first prism PSMa rotates around the first rotational axis Axma as much as a first angle and the second prism PSMb rotates around the second rotational axis Axmb as much as a second angle, the first actuator ACTa rotates the first prism PSMa in a third direction which is opposite to the first direction as much as a third angle in response to the first control signal Saca, and the second actuator ACTb rotates the second prism PSMb a fourth direction which is opposite to the second direction as much as a fourth angle in response to the second control signal Sacb. The third angle is a half of the first angle, and the fourth angle is a half of the second angle.

Particularly, the first actuator ACTa and the second actuator ACTb are used, and an angle compensation is performed, and accordingly, there is an advantage that an angle within a predetermined range only needs to be compensated without regard to the case that the optical zoom of the lens structure 593 is in low magnification or high magnification state. Consequently, without regard to an optical zoom, an accuracy of the hand tremor compensation is improved.

In addition, an optimal space arrangement is available within a limited space, and accordingly, a slim camera 500a may be implemented. Accordingly, this may be applied to the mobile terminal 100.

FIG. 5A illustrates that a length of the lens structure 593 is Wa, a length of the dual prism structure 592 is Wpa, and a height of the lens structure 593 and the dual prism structure 592 is ha.

Since the first prism module 592a and the second prism module 592b in the dual prism structure 592 are disposed to intersect with each other, as in the mobile terminal 100a of FIG. 5B, a propagation direction of the incident light RI is changed in two times through the first prism module 592a and the second prism module 592b, and the image sensor 520 is disposed at a left side of the mobile terminal 100a. Particularly, the image sensor 520 may be disposed to face a side surface of the mobile terminal 100a.

Accordingly, the thickness DDa of the mobile terminal 100y is determined by the height ha of the lens structure 593 and the dual prism structure 592 or a height ho of the image sensor, not by a summation (Wa+Wpa) of the lengths of the lens structure 593 and the dual prism structure 592.

Therefore, as the height ha of the lens structure 593 and the dual prism structure 592 or the height ho of the image sensor are designed to be lower, the thickness DDa of the mobile terminal 100y may be implemented slimly. Consequently, it may be implemented the slim camera 500a of which thickness decreases and the mobile terminal provided with it.

Figure 6A:
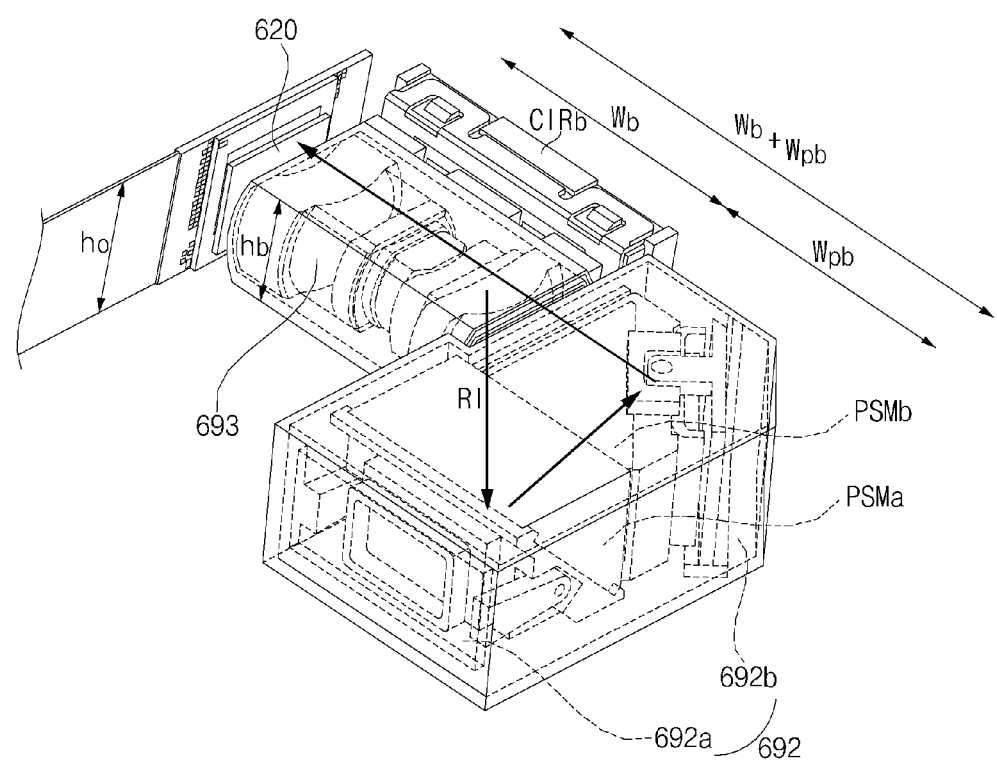
FIG. 6A is a diagram illustrating another example of a camera including a rotatable dual prism module according to an embodiment of the present disclosure.
Figure 6B:
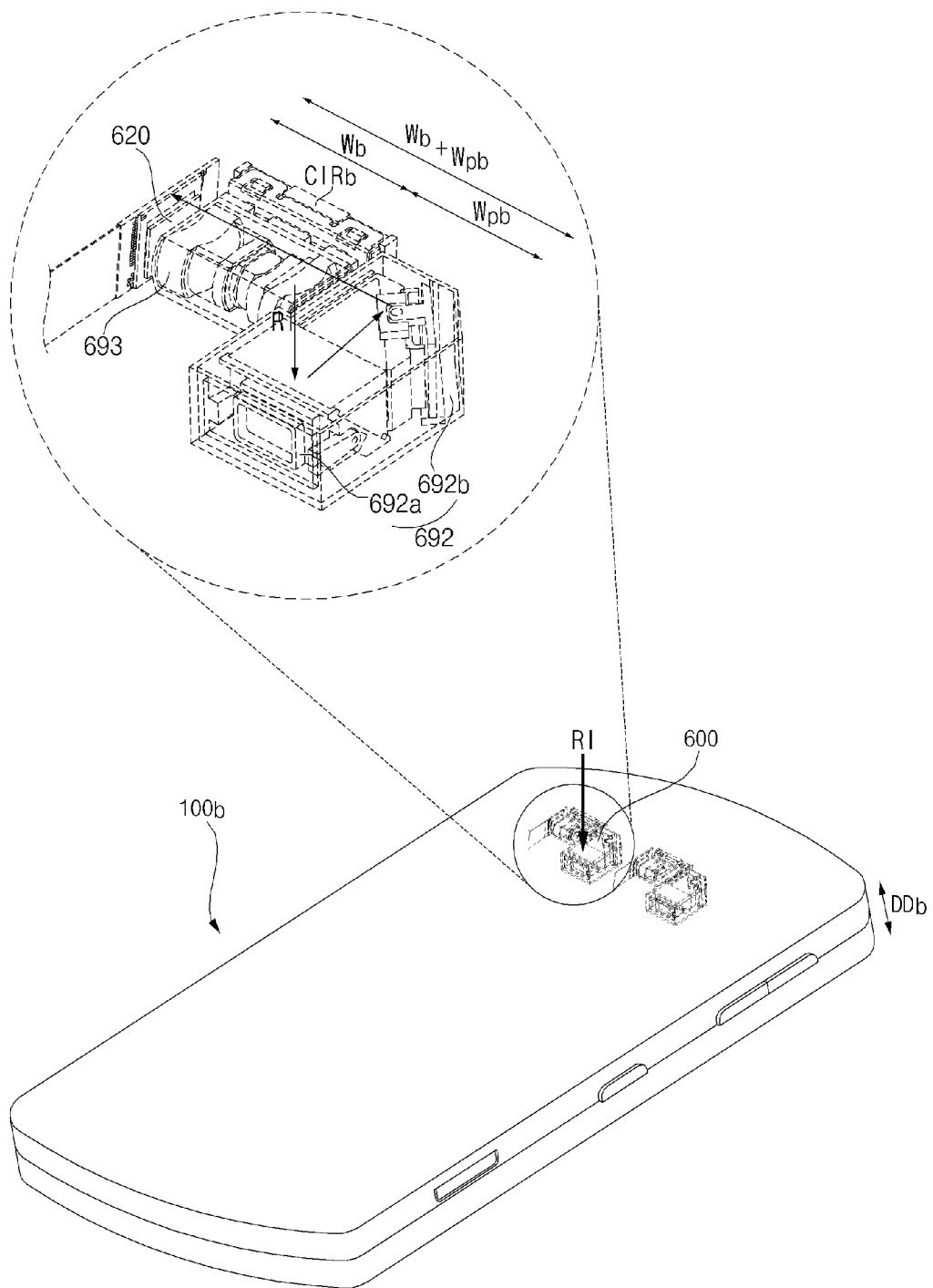
FIG. 6B is a diagram illustrating a mobile terminal including the camera of FIG. 6A.

FIG. 6A is a diagram illustrating another example of a camera including a rotatable dual prism module according to an embodiment of the present disclosure, and FIG. 6B is a diagram illustrating a mobile terminal including the camera of FIG. 6A. FIGS. 7 to 9C are diagrams referred in the description of the camera shown in FIG. 6A.

FIG. 6A illustrates that a camera 600 includes an image sensor 620, a lens structure 693 for transferring light to the image sensor 620 and a dual prism structure 692 including a first prism module 692a and a second prism module 692b.

The camera 600 shown in FIG. 6A is similar to the camera 500a shown in FIG. 5A, but there is a difference that an arrangement of the first prism module 692a and the second prism module 692b is different. The difference is mainly described.

FIG. 6A illustrates the arrangement in the order of the image sensor 620, the lens structure 693 and the dual prism structure 692, and that the light incident to the dual prism structure 692 is transferred to the lens structure 693 and image sensor 620.

Particularly, the light from upper side is reflected on a reflection surface of a first prism PSMa in the first prism module 692a and transferred to the second prism module 692b, and then, reflected on a reflection surface of a second prism PSMb in the second prism module 692b and transferred to the image sensor 620.

That is, different from FIG. 5A, the first prism module 692a in the dual prism structure 692 is disposed in a forward direction in comparison with the second prism module 692b. Accordingly, the light reflected on the prism module PSMa in the first prism module 692a is propagated in a ground direction or a right direction.

That is, different from FIG. 6A, it is arranged in the order of the image sensor 620, the dual prism structure 692 and the lens structure 693, the light incident to the lens structure 693 may be transferred to the dual prism structure 692 and image sensor 620. Hereinafter, the structure of FIG. 6A is mainly described.

The dual prism structure 692 may include a first prism PSMa for reflecting an incident light in a first reflection direction, a first actuator ACTa for changing the first reflection direction by changing an angle of the first prism PSMa around a first rotational axis Axma based on a first control signal Saca, a second prism PSMb for reflecting the light reflected by the first prism PSMa to a second reflection direction and a second actuator ACTb for changing the second reflection direction by changing an angle of the second prism PSMb around a second rotational axis Axmb based on an input second control signal Sacb.

The first prism PSMa includes a first internal reflection surface RSa, and the second prism PSMb includes a second internal reflection surface.

Meanwhile, the first prism PSMa receives an incident light through a first incident prism surface ISa and outputs a reflected incident light from the first internal reflection surface RSa through a first output prism surface OSa. The second prism PSMb receives a reflected incident light through a second incident prism surface ISb and outputs a reflected light reflected from the second internal reflection surface RSb.

Meanwhile, the first output prism surface OSa of the first prism PSMa faces the second incident prism surface ISb of the second prism PSMb.

Meanwhile, the first rotational axis Axma of the first prism PSMa is orthogonal to the second rotational axis Axmb of the second prism PSMb.

In this case, it is preferable that the first prism PSMa and the second prism PSMb are disposed to intersect with each other. Particularly, it is preferable that the first prism PSMa and the second prism PSMb are orthogonally disposed.

Meanwhile, the refractive indices of the first prism PSMa and the second prism PSMb may be 1.7 or greater. Accordingly, total reflection may be performed in the first prism PSMa and the second prism PSMb, and consequently, light RI may be transferred to the image sensor direction.

Meanwhile, the refractive indices of the first prism PSMa and the second prism PSMb may be less than 1.7, and reflective coatings may be formed on the reflection surfaces of the respective first prism PSMa and the second prism PSMb. Accordingly, total reflection may be performed in the first prism PSMa and the second prism PSMb, and consequently, light RI may be transferred to the image sensor direction.

According to this, the image sensor 620, the lens structure 693 and the first prism module 692a may be disposed in one direction side by side, but the second prism module 692b may be disposed to intersect with the first prism module 692a.

Accordingly, the first prism module 692a and the second prism module 692b may be referred to as the L-shaped dual prism structure 692. In addition, such a camera 600 structure may be referred to as the L-shaped type camera.

According to the structure, the first prism module 692a and the second prism module 692b may perform an angle compensation by rotating in a first direction, for example, counter clockwise direction ccw based on the first rotational axis Axma and by rotating in a second direction, for example, counter clockwise direction ccw based on the second rotational axis Axmb, and therefore, may implement the image stabilization function.

Particularly, the rotational actuator is used, and an angle compensation is performed, and accordingly, there is an advantage that an angle within a predetermined range only needs to be compensated without regard to the case that the optical zoom of the lens structure 693 is in low magnification or high magnification state. Consequently, without regard to an optical zoom, an accuracy of the hand tremor compensation is improved.

In addition, an optimal space arrangement is available within a limited space, and accordingly, a slim camera 600 may be implemented. Accordingly, this may be applied to the mobile terminal 100.

FIG. 6A illustrates that a length of the lens structure 693 is Wb, a length of the dural prism structure 692 is Wpb, and a height of the lens structure 693 and the dual prism structure 692 is hb.

Since the first prism module 692a and the second prism module 692b in the dual prism structure 692 are disposed to intersect with each other, as in the mobile terminal 100b of FIG. 6B, a propagation direction of the incident light RI is changed in two times through the first prism module 692a and the second prism module 692b, and the image sensor 620 is disposed at a left side of the mobile terminal 100b. Particularly, the image sensor 620 may be disposed to face a side surface of the mobile terminal 100b.

Accordingly, the thickness DDb of the mobile terminal 100y is determined by the height hb of the lens structure 693 and the dual prism structure 692 or a height ho of the image sensor, not by a summation (Wb+Wpb) of the lengths of the lens structure 693 and the dual prism structure 692.

Therefore, as the height ha of the lens structure 693 and the dual prism structure 692 or the height ho of the image sensor are designed to be lower, the thickness DDb of the mobile terminal 100y may be implemented slimly. Consequently, it may be implemented the slim camera 600 of which thickness decreases and the mobile terminal provided with it.

Figure 7:
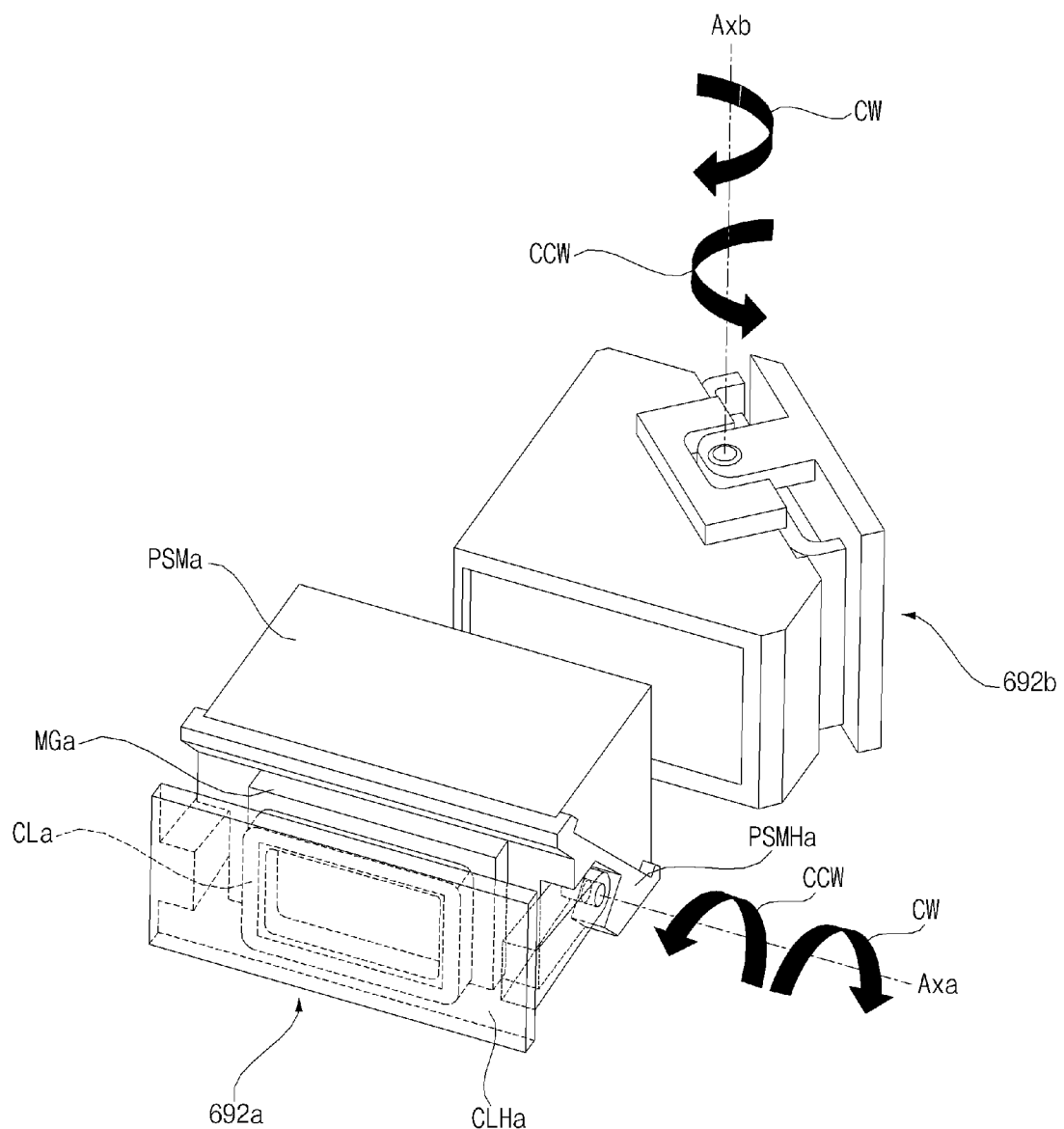
FIGS. 7 to 9C are diagrams referred in the description of the camera shown in FIG. 6A.
Figure 8:
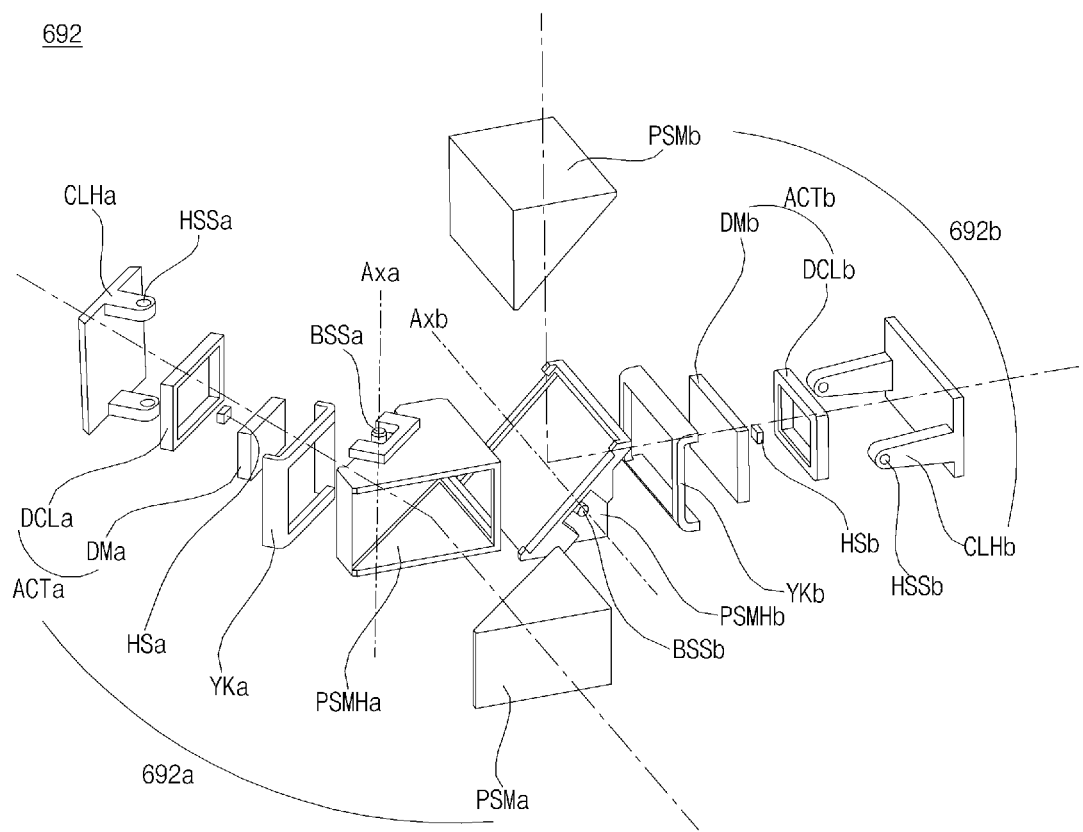

Meanwhile, in describing with reference to FIG. 7 and FIG. 8, the dual prism structure 692 may include the first prism module 692a and the second prism module 692b.

The first prism module 692a may include the prism PSMa, a first prism holder PSMHa for fixing the first prism PSMa, a first yoke Yka coupled to a rear side of the first prism holder PSMHa, a first driving magnet DMa coupled to a rear side of the first yoke Yka and a plurality of protrusions protruded toward the first prism holder PSMHa. Each of the protrusions may include an opening portion HSSa, and the opening portion HSSa may include a first coil holder CLHa for limiting the first rotational axis Axma.

A first driving coil DCLa may be disposed between the first coil holder CLHa and the first yoke Yka, and the first prism PSMa holder may include a plurality of bosses BSSa coupled with an opening of a plurality of protrusions so as to rotate the first prism PSMa around the first rotational axis Axma.

Meanwhile, the driving magnet DMa and the driving coil DCLa in the first prism module 692a may construct the first rotational actuator ACTa.

For example, in order to compensate the first directional motion between the first directional motion and the second directional motion detected by the motion sensor 145, particularly, the gyro sensor 145c shown in FIG. 3C or FIG. 3D, the driving controller DRC may output the first control signal Saca to the first actuator ACTa in the first prism module 692a.

The first actuator ACTa, based on the first control signal Saca, may change an angle of the first prism PSMa along the first rotational axis.

Particularly, based on the first control signal Saca applied to the driving coil DCLa in the first actuator ACTa, the first actuator ACTa may change an angle of the first prism PSMa along the first rotational axis.

Meanwhile, the first Hall sensor HSa may sense magnetic field change according to the movements of the first prism PSMa in order to check movement information. Particularly, the first Hall sensor HSa may detect an angle change of the first prism PSMa based on first magnetic field.

Furthermore, the motion information detected by the first Hall sensor HSa, particularly, the first magnetic field change information Shsa may be input to the driving controller DRC.

The driving controller DRC may perform PI control and the like based on the control signal Saca for motion compensation and the motion information, particularly, the first magnetic field change information Shsa, and accordingly, may control motions of the first prism PSMa precisely.

That is, the driving controller DRC may receive the information Shsa detected by the first Hall sensor HSa and may perform a closed loop control, and accordingly, may control the motion of the first prism PSMa precisely.

Accordingly, the driving magnet DMa, the prism holder PSMHa and the prism PSMa may be rotated around the first rotational axis Axa.

Meanwhile, the coil holder CLHa, the driving coil DCLa and the Hall sensor HSa may not be rotated around the first rotational axis Axa, but fixed.

As such, a part of units in the first prism module 692a is rotated and a part of units in the first prism module 692a is fixed and based on the magnetic field signal sensed in the Hall sensor HSa, a hand tremor is sensed. In order to compensate the hand tremor, the driving magnet DMa is rotated and accordingly, the prism PSMa may be rotated. Therefore, a hand tremor compensation for the first direction may be precisely performed.

Meanwhile, in describing with reference to FIG. 8, the second prism module 692b may include the prism PSMb, a second prism holder PSMHb for fixing the second prism PSMb, a second yoke Yka coupled to a rear side of the second prism holder PSMHb, a second driving magnet DMb coupled to a rear side of the second yoke Ykb and a plurality of protrusions protruded toward the second prism holder PSMHb. Each of the protrusions may include an opening portion HSSa, and the opening portion HSSa may include a second coil holder CLHb for limiting the second rotational axis Axmb.

A second driving coil DCLb may be disposed between the second coil holder CLHb and the second yoke Ykb, and the second prism PSMb holder may include a plurality of bosses BSSb coupled with an opening of a plurality of protrusions so as to rotate the second prism PSMb around the second rotational axis Axmb.

Meanwhile, the driving magnet DMb and the driving coil DCLb in the second prism module 692b may construct the second rotational actuator ACTb.

For example, in order to compensate the first directional motion between the first directional motion and the second directional motion detected by the motion sensor 145, particularly, the gyro sensor 145c shown in FIG. 3C or FIG. 3D, the driving controller DRC may output the second control signal Sacb to the second actuator ACTb in the second prism module 692b.

The second actuator ACTb, based on the second control signal Sacb, may change an angle of the second prism PSMb along the second rotational axis.

Particularly, based on the second control signal Sacb applied to the driving coil DCLb in the second actuator ACTb, the second actuator ACTb may change an angle of the second prism PSMb along the second rotational axis.

Meanwhile, the second Hall sensor HSb may sense magnetic field change according to the movements of the second prism PSMb in order to check movement information. Particularly, the second Hall sensor HSb may detect an angle change of the second prism PSMb based on second magnetic field.

Furthermore, the motion information detected by the second Hall sensor HSb, particularly, the first magnetic second change information Shsb may be input to the driving controller DRC.

The driving controller DRC may perform PI control and the like based on the control signal Sacab for motion compensation and the motion information, particularly, the first magnetic field change information Shsb, and accordingly, may control motions of the second prism PSMb precisely.

That is, the driving controller DRC may receive the information Shsb detected by the second Hall sensor HSb and may perform a closed loop control, and accordingly, may control the motion of the second prism PSMb precisely.

Accordingly, the driving magnet DMb, the prism holder PSMHb and the prism PSMb may be rotated around the second rotational axis Axb.

Meanwhile, the coil holder CLHb, the driving coil DCLb and the Hall sensor HSb may not be rotated around the second rotational axis Axb, but fixed.

As such, a part of units in the second prism module 692b is rotated and a part of units in the second prism module 692b is fixed and based on the magnetic field signal sensed in the Hall sensor HSb, a hand tremor is sensed. In order to compensate the hand tremor, the driving magnet DMb is rotated and accordingly, the prism PSMb may be rotated. Therefore, a hand tremor compensation for the second direction may be precisely performed.

For example, as shown in FIG. 7, by a hand tremor of a user, in the case that the first prism PSMa is rotated in clockwise direction CCW based on the first rotational axis Axa, for the hand tremor compensation, the driving controller DRC may control the first prism PSMa and the first sensor magnet SMa is rotated in counter clockwise direction CCW using the first rotational actuator ACTa, particularly, the first driving magnet DMa and the first driving coil DCLa.

Particularly, in the case that the first control signal Saca from the driving controller DRC is applied to the first driving coil DCLa in the first actuator ACTa, Lorentz's force is generated between the first driving coil DCLa and the first driving magnet DMa, the first driving magnet DMa may rotate in counter clockwise direction CCW.

In this case, the first Hall sensor HSa may detect change of magnetic field changed by the rotation in counterclockwise direction CCW of the first sensor magnet SMa.

Furthermore, the driving controller DRC performs a closed loop control based on the information Shsa detected in by the first Hall sensor HSa, and accordingly, the rotation in counterclockwise direction CCW of the first driving magnet DMa may be controlled more precisely.

For another example, as shown in FIG. 7, by a hand tremor of a user, in the case that the second prism PSMb is rotated in clockwise direction CW based on the second rotational axis Axb, for the hand tremor compensation, the driving controller DRC may control the second prism PSMb and the second sensor magnet SMb is rotated in counter clockwise direction CCW using the second rotational actuator ACTb, particularly, the second driving magnet DMb and the second driving coil DCLb.

Particularly, in the case that the second control signal Sacb from the driving controller DRC is applied to the second driving coil DCLb in the second actuator ACTb, Lorentz's force is generated between the second driving coil DCLb and the second driving magnet DMb, the second driving magnet DMb may rotate in counter clockwise direction CCW.

In this case, the second Hall sensor HSb may detect change of magnetic field changed by the rotation in counterclockwise direction CCW of the second sensor magnet SMb.

Furthermore, the driving controller DRC performs a closed loop control based on the information Shsb detected in by the second Hall sensor HSb, and accordingly, the rotation in counterclockwise direction CCW of the second driving magnet DMb may be controlled more precisely.

As such, the first prism module 692a and the second prism module 692b may be driven independently based on the respective first rotational axis Axa and the second rotational axis Axb according to the hand tremor motion. Therefore, the hand tremor compensation for a plurality of directions may be performed rapidly and precisely.

Meanwhile, when the first prism PSMa moves in a first angle θ1 in a first direction of the first rotational axis Axa, the first actuator ACTa may change the first prism PSMa in a second angle θ2, which is a half of the first angle θ1, in a second direction which is opposite to the first direction. Accordingly, although the hand tremor motion of the user, the motion compensation is performed with an angle smaller than the motion, and precise hand tremor compensation becomes available. In addition, the power consumption is also decreased.

Meanwhile, when the second prism PSMb moves in a third angle θ3 in a third direction of the second rotational axis Axb, the second actuator ACTb may change the second prism PSMb in a fourth angle θ4, which is a half of the third angle θ3, in the fourth direction which is opposite to the third direction. Accordingly, although the hand tremor motion of the user, the motion compensation is performed with an angle smaller than the motion, and precise hand tremor compensation becomes available. In addition, the power consumption is also decreased. This is described with reference to FIG. 9A to FIG. 9C below.

Figure 9A:
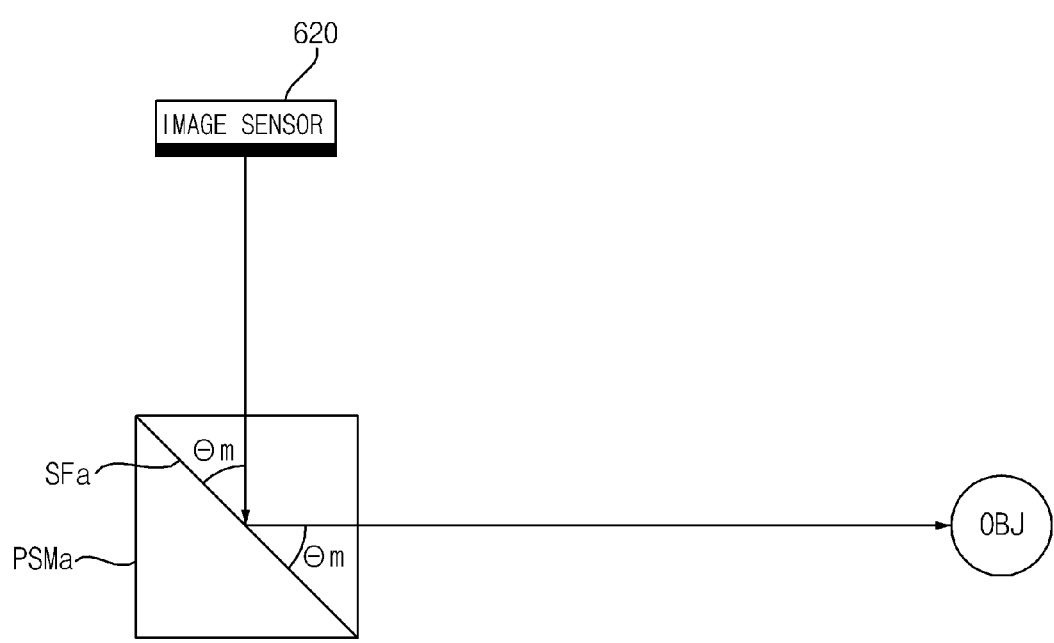
Figure 9B:
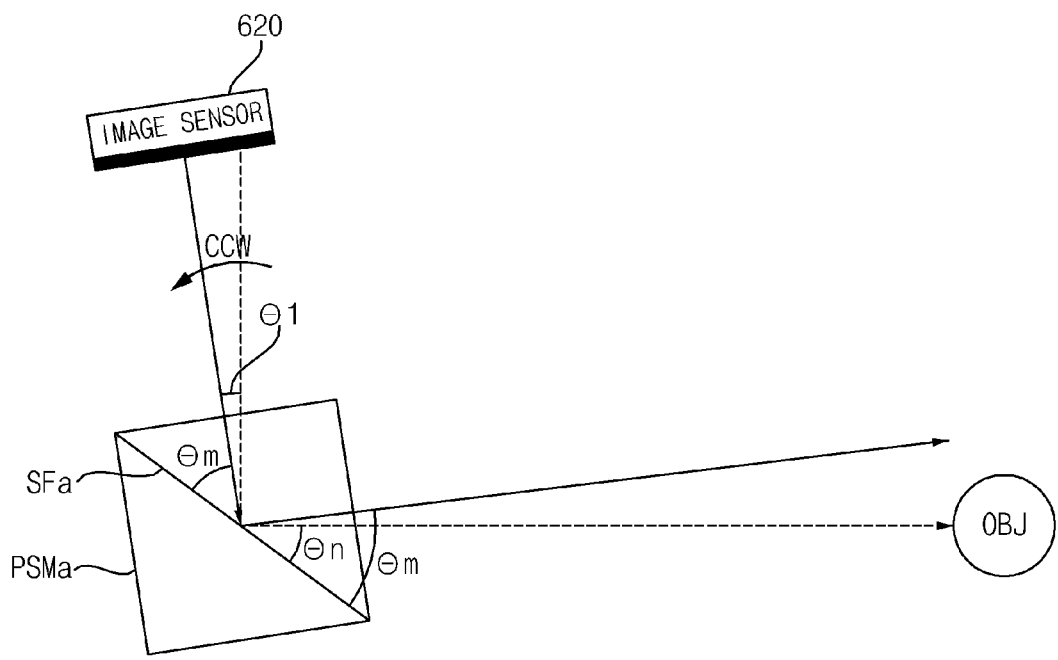
Figure 9C:
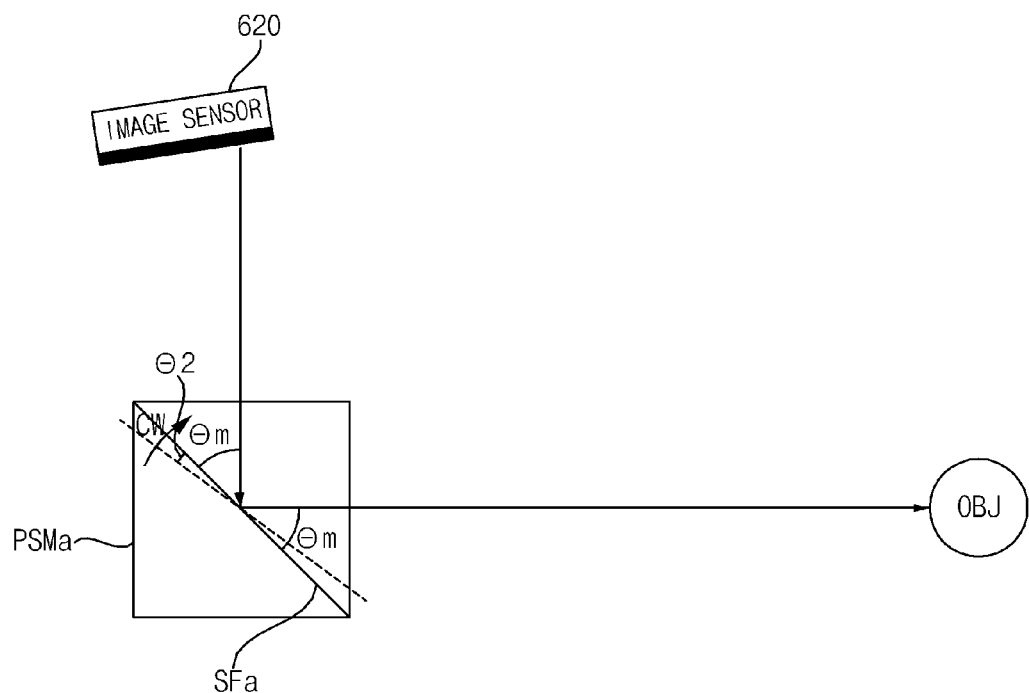

FIGS. 9A to 9C are diagrams referred to describe a hand tremor motion and a compensation according to the hand tremor motion.

Hereinafter, for the convenience of description, it is described the image sensor 620, the first prism PSMa and a front object OBL.

First, FIG. 9A illustrates the first prism PSMa disposed between the front object OBL and the image sensor 620 is fixed, in the case that there is no hand tremor of a user.

According to FIG. 9A, an angle between the image sensor 620 and a reflective surface SFa of the first prism PSMa is θm, and an angle between the reflective surface SFa of the first prism PSMa and the front object OBL is also θm. Here, Om may be about 45 degree.

According to this, the image sensor 620 may capture light for the front object OBL through the light incident by being reflected on the reflective surface SFa of the first prism PSMa and may change it to an electronic signal. Accordingly, an image transformation for the front object OBL becomes available.

Next, FIG. 9B illustrates that the first prism PSMa disposed between the front object OBL and the image sensor 620 is rotated as much as the first angle θ1 in counterclockwise direction CCW in the case that a hand tremor of a user is generated as much as the first angle θ1 in counterclockwise direction CCW.

According to FIG. 9B, an angle between the image sensor 620 and a rotated reflective surface SFa of the first prism PSMa is θm, but an angle between the reflective surface SFa of the first prism PSMa and the front object OBL is θn, which is smaller than θm.

In other words, the angle between the image sensor 620 and the rotated reflective surface SFa of the first prism PSMa is θm, and the front object OBL is not located in the direction of θm angle from the reflective surface SFa of the rotated first prism PSMa.

Therefore, the image sensor 620 may not capture light for the front object OBL through the light incident by being reflected on the reflective surface SFa of the first prism PSMa.

Accordingly, the first actuator ACTa may rotate the first prism in clockwise direction cw with the second angle θ2, which is a half of the first angle θ1.

FIG. 9C illustrates that the first actuator ACTa may rotate the first prism in clockwise direction cw as much as the second angle θ2, which is a half of the first angle θ1 for a hand tremor prevention of a user.

Accordingly, as shown in FIG. 9A again, an angle between the image sensor 620 and a rotated reflective surface SFa of the first prism PSMa is Om, and an angle between the rotated reflective surface SFa of the first prism PSMa and the front object OBL is also θm.

According to this, the image sensor 620 may capture light for the front object OBL through the light incident by being reflected on the reflective surface SFa of the first prism PSMa and may change it to an electronic signal. Accordingly, even in the case that a hand tremor occurs, an image transformation for the front object OBL becomes available stably, through the hand tremor compensation.

Figure 10:
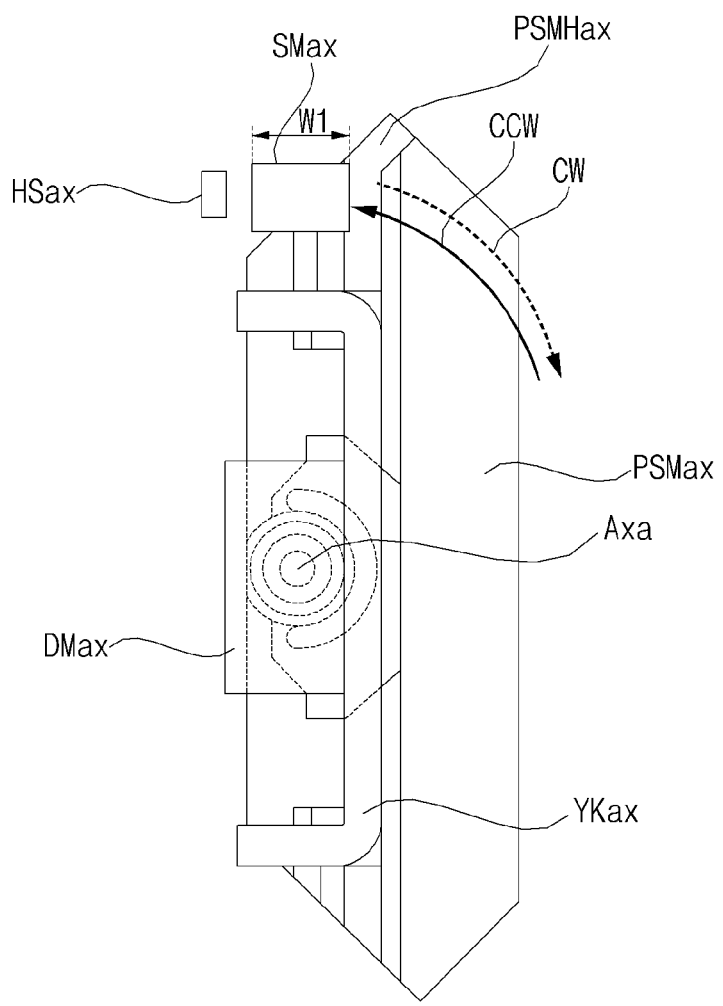
FIG. 10 is a diagram of the first prism module 692a of FIG. 6A to FIG. 7 viewed in a bottom direction from a top side.

FIG. 10 is a diagram of the first prism module 692a of FIG. 6A to FIG. 7 viewed in a bottom direction from a top side.

According to the prism module 692a of FIG. 10, a prism PSMa is disposed on a first surface of a prism holder PSMHa, and a yoke Yka is disposed on a second surface, which is a rear surface of the first surface. Particularly, on the second surface of the prism holder PSMHa, the first surface of the yoke Yka may be disposed.

Meanwhile, a sensor magnet SMa is disposed at an upper side of the yoke Yka, and a Hall sensor Hsaz may be disposed with being spaced apart from the sensor magnet SMa.

That is, in the state that a rotational axis AXa is located in upper and lower directions, the yoke Yka is disposed around the rotational axis AXa, the sensor magnet SMa is disposed with being spaced apart from the yoke Yka, and the Hall sensor Hsa may be disposed with being spaced apart from the sensor magnet SMa.

In this case, based on the rotational axis AXa, the separation distances become greater in the order of the yoke Yka, the sensor magnet SMa and the Hall sensor Hsa.

Meanwhile, the yoke Yka and the sensor magnet SMa may be spaced apart in a vertical direction of the ground surface, and the sensor magnet SMa and the Hall sensor Hsa may be spaced apart in a horizontal direction of the ground surface.

That is, the separation direction between the yoke Yka and the sensor magnet SMa may intersect with the separation direction between the sensor magnet SMa and the Hall sensor Hsa.

Meanwhile, various modification is available for the position of the Hall sensor Hsa and the sensor magnet SMa.

In this case, as described in the description of FIG. 6A to FIG. 8, by a hand tremor of a user, in the case that the first prism PSMa is rotated in first clockwise direction CW based on the first rotational axis Axa, for the hand tremor compensation, the driving controller DRC may control the first prism PSMa and the first sensor magnet SMa is rotated in counter clockwise direction CCW using the first rotational actuator, particularly, the first driving magnet DMa and the first driving coil.

Particularly, in the case that the first control signal Saca from the driving controller DRC is applied to the first driving coil DCLa in the first actuator ACTa, Lorentz's force is generated between the first driving coil DCLa and the first driving magnet DMa, the first driving magnet DMa may rotate in counter clockwise direction CCW.

In this case, the first Hall sensor HSa may detect change of magnetic field changed by the rotation in counterclockwise direction CCW of the first sensor magnet SMa.

Meanwhile, in the case that a range of the rotational angle according to the hand tremor is about 10 degree to −10 degree, the angle compensation range by the rotation in counterclockwise direction CCW may be about 5 degree to −5 degree, which is a half of the range of the rotational angle in clockwise direction CW according to the hand tremor.

Meanwhile, according to FIG. 10, even in the case that the rotational angle in clockwise direction CW becomes smaller since the hand tremor is small, an accurate detection is available in the Hall sensor Hsa, and consequently, an accuracy of the angle compensation for rotation in counter-clockwise direction CCW may be improved.

Meanwhile, the description of FIG. 10 is described based on the first prism module 692a between the first prism module 692*a* and the second prism module 692*b* of FIG. 6A to FIG. 8, and applicable to the first prism module 692*a*, but not limited thereto, and also applicable to the second prism module 692*b*.

Meanwhile, the dual prism structure 692 including the first prism module 692*a* and the second prism module 692*b* described in FIG. 6A to FIG. 10 may be adopted to various electronic devices such as the mobile terminal 100 of FIG. 2, a vehicle, a TV, a drone, a robot and a robot cleaner.

FIG. 10 is a diagram referred in a description of a prism module.

Referring to the drawing, like the prism module 692*x* of FIG. 10, a prism PSMax may be seated on a first surface of a prism holder PSMHax, a yoke Ykax may be disposed on a second surface of the prism holder PSMHax, and in the state that a rotational axis AXa is disposed in a vertical direction of the ground, a sensor magnet SMax may be disposed at an upper side of the yoke Ykax, and a Hall sensor HSax may be disposed with being spaced apart from the sensor magnet SMax.

In this case, by a hand tremor of a user, in the case that the rotational axis is rotated in counterclockwise direction CCW, the Hall sensor HSax may detect a change of magnetic field varied by a rotation of the sensor magnet SMax.

Meanwhile, a width of the sensor magnet SMax may be W1 as shown in the drawing.

However, since the change of magnetic field or strength of magnetic field induced by the sensor magnet SMax only is weak, an accuracy in detection of the change of magnetic field or strength of magnetic field in the Hall sensor HSax becomes decreased.

Meanwhile, as shown in FIG. 5 to FIG. 8, by using the rotational actuator, particularly, the driving magnet and the driving coil, an angle compensation may be performed to rotate clockwise direction CW.

The angle compensation in this case is determined by detecting change or strength of magnetic field detected in the Hall sensor HSax, and as the change or strength of magnetic field detected in the Hall sensor HSax decreases, a detection accuracy in the Hall sensor HSax becomes decreased.

Accordingly, the present disclosure proposes a method of increasing a detection accuracy of change of magnetic field or strength of magnetic field detected in the Hall sensor. This is described with reference to FIG. 11 below.

Figure 11:
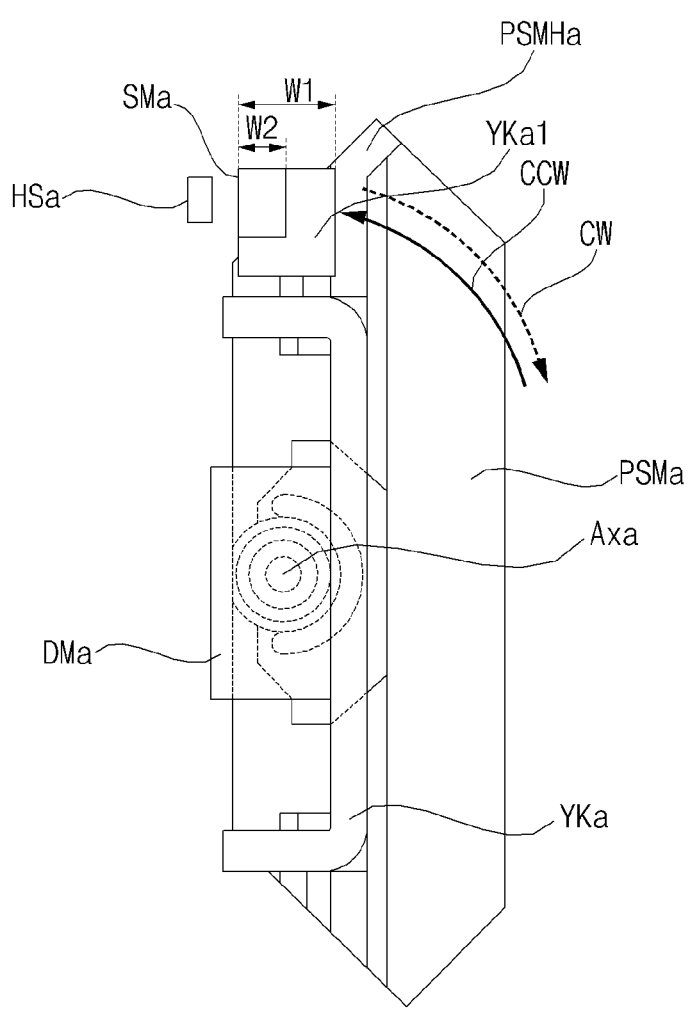
FIG. 11 is a diagram illustrating a prism module according to an embodiment of the present disclosure.

FIG. 11 is a diagram illustrating a prism module according to an embodiment of the present disclosure, and FIG. 12A to FIG. 14 are diagrams referred in the description of FIG. 11.

According to the prism module 692*a* shown in FIG. 11, a prism PSMa may be seated on a first surface of a prism holder PSMHa, a yoke Yka may be disposed on a second surface of the prism holder PSMHa, and in the state that a rotational axis AXa is disposed in a vertical direction of the ground, a sensor magnet SMa may be disposed at an upper side of the yoke Yka, and a Hall sensor HSa may be disposed with being spaced apart from the sensor magnet SMa.

Meanwhile, a driving magnet DMa may be seated on the yoke Yka.

In this case, as described in FIG. 7 and FIG. 8, a compensation signal based on the magnetic field detected by the Hall sensor Has is applied to the driving coil DCLa, Lorentz's force is generated between the driving coil DCLa and the driving magnet DMa, and the driving magnet DMa may be rotated in a first direction.

For example, by a hand tremor of a user, in the case that the rotational axis Axa is rotated in counterclockwise direction CCW, the Hall sensor HSa may detect a change of magnetic field varied by a rotation of the sensor magnet SMa.

However, since the change of magnetic field or strength of magnetic field induced by the sensor magnet SMax only is weak, according to the present disclosure, the prism module 692*a* includes a sensor magnet supporting member Yka1 to which the sensor magnet SMa is attached.

Particularly, it is preferable that the sensor magnet supporting member Yka1 is disposed at an upper side of the yoke Yka.

In this case, it is preferable that the sensor magnet supporting member Yka1 includes a magnetic field shielding material that may shield magnetic field in a direction opposite to the Hall sensor HSa, not in a direction of the Hall sensor HSa.

For example, the sensor magnet supporting member Yka1 may be steel plate cold commercia (SPCC), Ferrite, and the like.

Alternatively, it is preferable that the sensor magnet supporting member Yka1 includes a material that may reinforce the magnetic field in the direction of the Hall sensor HSa.

FIG. 11 illustrates that a first surface (left surface) and a second surface (upper surface) of the sensor magnet SMa seated on the sensor magnet supporting member Yka1 are exposed to outside.

Particularly, it is illustrated that the lower surface and the right surface of the sensor magnet SMa contacts the sensor magnet supporting member Yka1 and are not exposed to outside, but only the left surface and the upper surface are exposed to outside.

According to this, the magnetic field in the right direction and the lower direction of the sensor magnet SMa becomes shielded. Accordingly, the magnetic field in the left direction and the upper direction of the sensor magnet SMa becomes stronger.

Meanwhile, as shown in FIG. 5 to FIG. 8, by using the rotational actuator, particularly, the driving magnet DMa and the driving coil CLa, an angle compensation may be performed to rotate clockwise direction CW.

The angle compensation in this case is determined by detecting change or strength of magnetic field detected in the Hall sensor HSa.

Meanwhile, according to FIG. 11, by the sensor magnet supporting member Yka1, since a strength of magnetic field around the Hall sensor HSa becomes significantly increased, a detection accuracy of change of magnetic field or strength of magnetic field detected in the Hall sensor HSa may be improved. Accordingly, an accuracy of the angle compensation may be improved.

Meanwhile, in the case that a range of the rotational angle of counterclockwise direction CCW according to the hand tremor may be about 10 degree to −10 degree. Accordingly, a range of the rotational angle in clockwise direction CW for compensation may be about 10 degree to −10 degree.

Meanwhile, according to FIG. 11, even in the case that the rotational angle in counterclockwise direction CCW becomes smaller since the hand tremor is small, an accurate detection is available in the Hall sensor HSa, and consequently, an accuracy of the angle compensation may be improved.

Meanwhile, owing to the sensor magnet supporting member Yka1, a width W2 or size of the sensor magnet SMa may be designed to be smaller than the width W1 or size of the sensor magnet SMax of FIG. 10.

The drawings illustrate that the width W2 of the sensor magnet SMa of FIG. 11 is about a half of the width W1 of the sensor magnet SMax of FIG. 10. For example, the width W2 of the sensor magnet SMa of FIG. 11 may be a half of the width W1 of the sensor magnet SMax and the sensor magnet supporting member Yka1. Accordingly, the manufacturing cost for the sensor magnet SMa may be reduced.

Figure 12A:
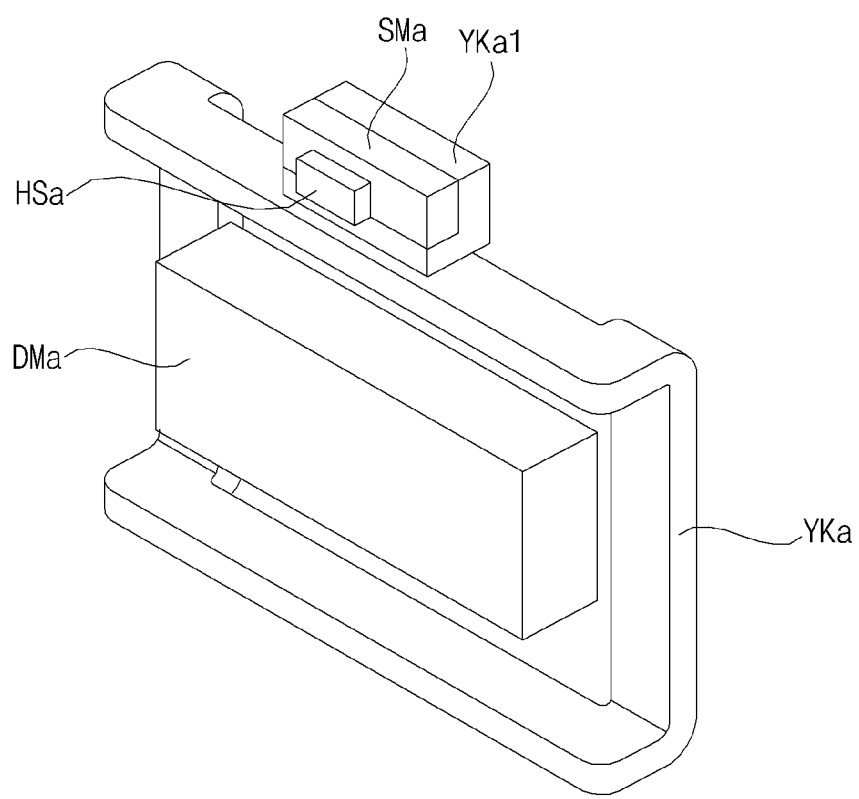
FIG. 12A to FIG. 14 are diagrams referred in the description of FIG. 11.
Figure 12B:
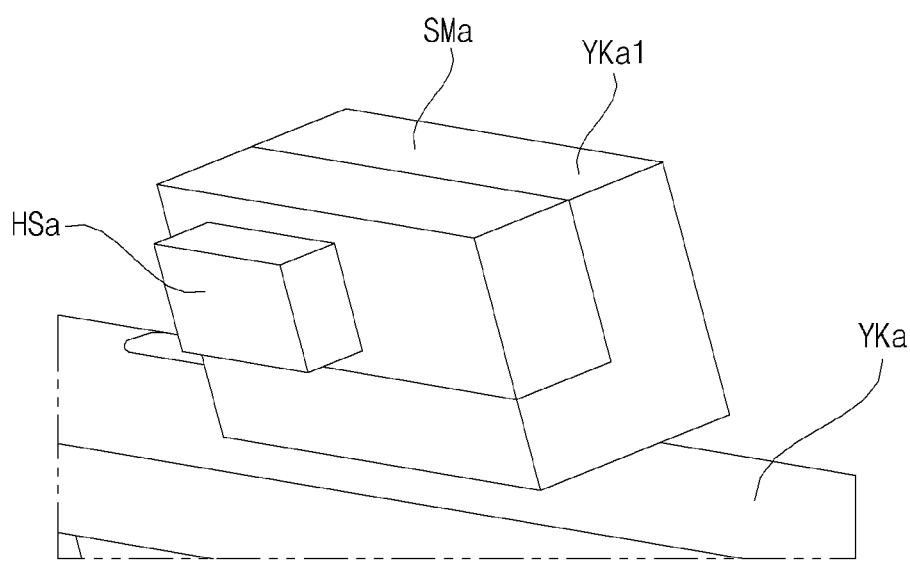

FIGS. 12A and 12B illustrate a top view and an expanded view of the sensor magnet supporting member Yka1, the sensor magnet SMa and the Hall sensor HSa.

Figure 12C:
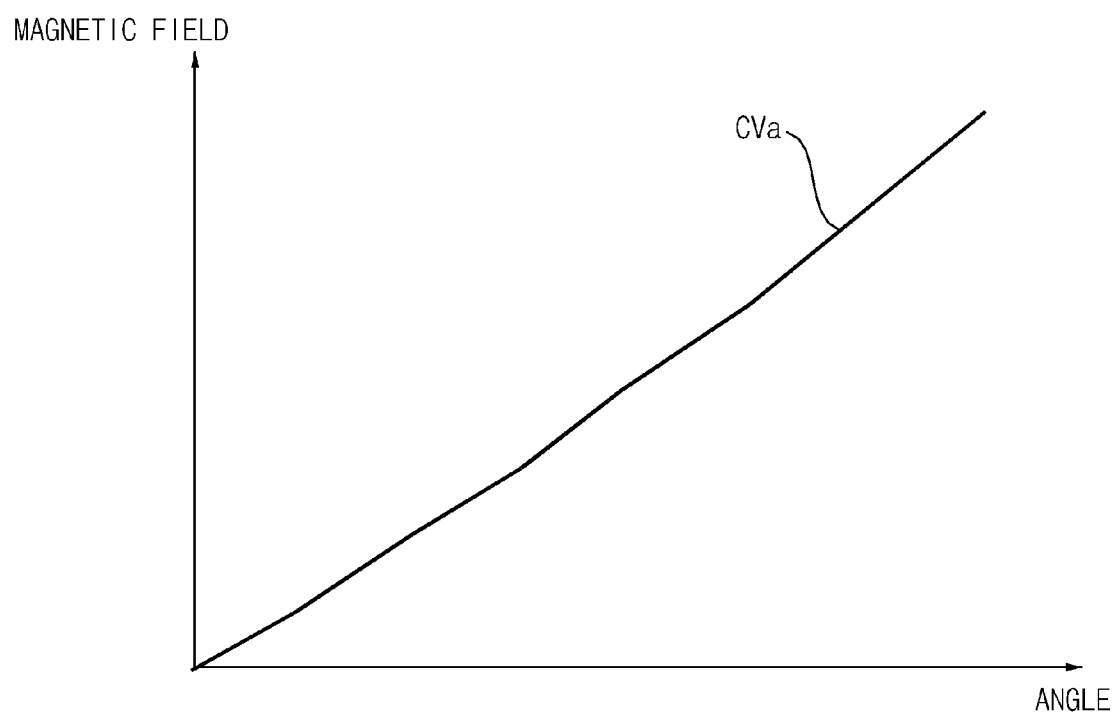
Figure 12D:
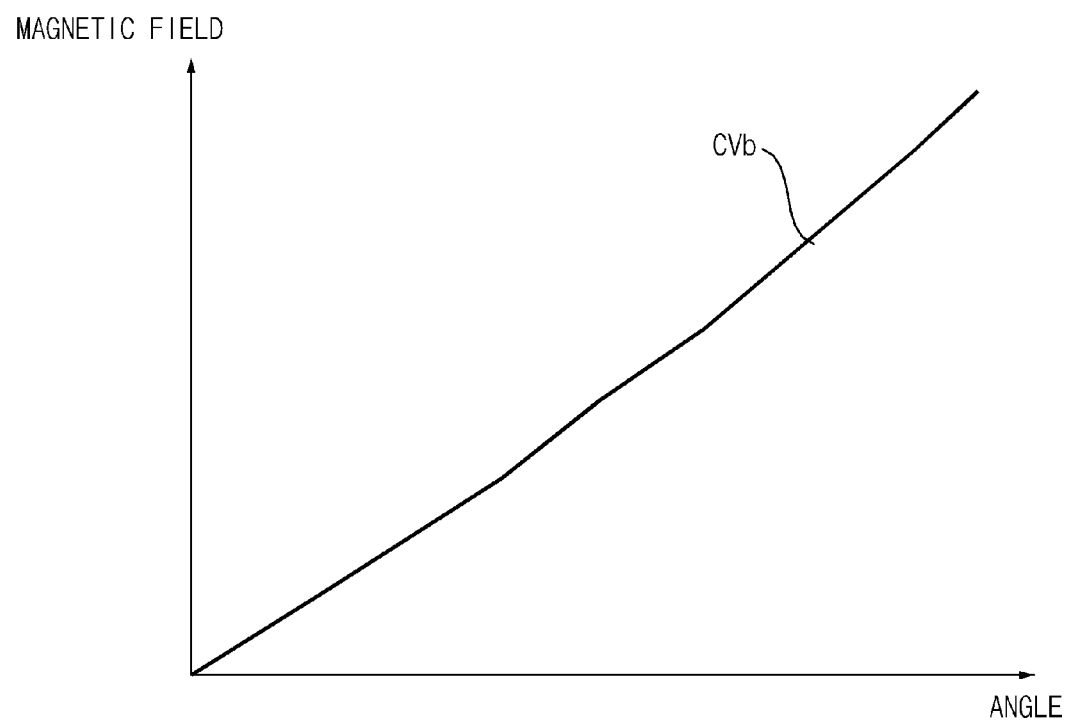

The strength change curve of the magnetic field according to the structure of FIG. 10 and FIG. 11 may be illustrated as shown in FIG. 12C and FIG. 12D.

According to the strength change curve CVa of the magnetic field of FIG. 12C corresponding to FIG. 10, in the case that the prism PSMa is rotated with a predetermined angle (e.g., 1 degree), the strength change of the magnetic field may be about 50 T. That is, the slope of the strength change curve CVa of the magnetic field of FIG. 12C may be about 50 T.

Meanwhile, according to the strength change curve CVb of the magnetic field of FIG. 12D corresponding to FIG. 11, in the case that the prism PSMb is rotated with a predetermined angle (e.g., 1 degree), the strength change of the magnetic field may be about 70 T. That is, the slope of the strength change curve CVb of the magnetic field of FIG. 12D may be about 70 T. Accordingly, the strength change of the magnetic field may be improved by 40% in comparison with FIG. 10.

Consequently, according to the prism module 692a of FIG. 11, a detection accuracy of change of magnetic field or strength of magnetic field detected in the Hall sensor HSa may be improved.

FIGS. 13A to 13D are diagrams illustrating various examples of prism modules according to an embodiment of the present disclosure.

Figure 13A:
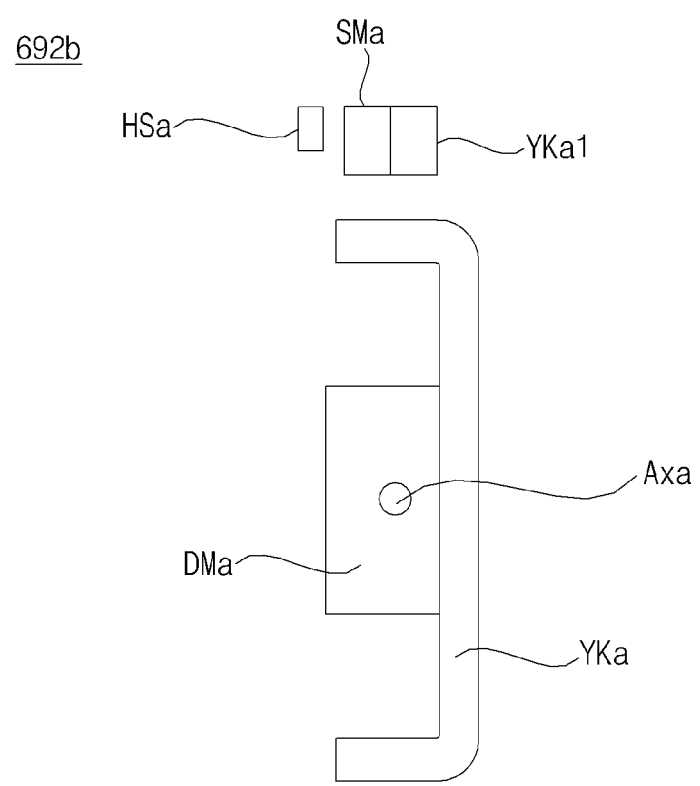

First, FIG. 13A illustrates that a first surface (left surface), a second surface (upper surface) and a third surface (lower surface) of the sensor magnet SMa seated on the sensor magnet supporting member Yka1 are exposed to outside.

Particularly, it is illustrated that a right surface of the sensor magnet SMa contacts the sensor magnet supporting member Yka1 and is not exposed to outside, and the left surface, upper surface and the lower surface are exposed to outside.

According to this, the magnetic field is shielded in the right direction of the sensor magnet SMa, and the magnetic field in the left direction, upper direction and lower direction of the sensor magnet SMa becomes greater, and consequently, the strength of the magnetic field around the Hall sensor HSa becomes greater.

Figure 13B:
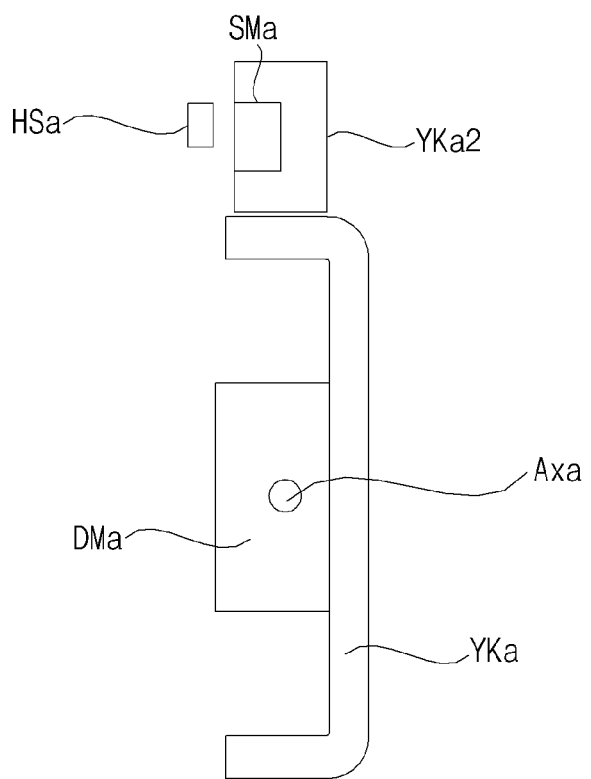

Next, FIG. 13B illustrates that a first surface (left surface) of the sensor magnet SMa seated on a sensor magnet supporting member Yka2 in a prism module 692c is exposed to outside.

Particularly, it is illustrated that a right surface, an upper surface and a lower surface of the sensor magnet SMa contact the sensor magnet supporting member Yka2 and are not exposed to outside, and the left surface of the sensor magnet SMa is exposed to outside.

According to this, the magnetic field is shielded in the right direction, the upper direction and the lower direction of the sensor magnet SMa, and the magnetic field in the left direction becomes greater, and consequently, the strength of the magnetic field around the Hall sensor HSa becomes greater.

Meanwhile, similar to the case shown in FIG. 13B, in the case that the sensor magnet supporting member Yka2 contacts the yoke Yka, the sensor magnet supporting member Yka2 and the yoke Yka may be formed with the same material. Accordingly, the sensor magnet supporting member Yka2 and the yoke Yka may be formed simultaneously, and there is an advantage that the manufacturing process becomes simplified.

In addition, owing to the contact between the sensor magnet supporting member Yka2 and the yoke Yka, the magnetic field shielding effect by the sensor magnet supporting member Yka2 may be more improved.

Figure 13C:
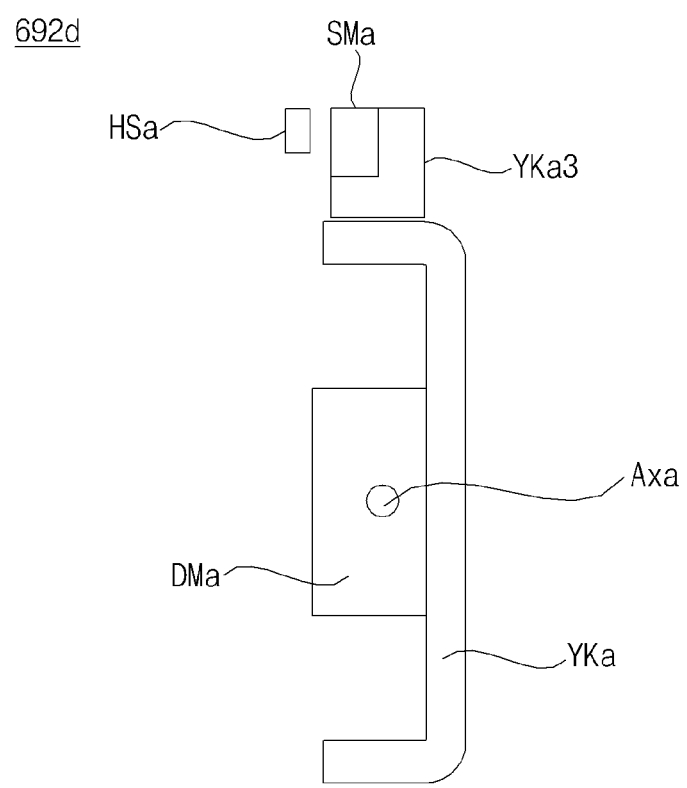

Next, FIG. 13C illustrates that a first surface (left surface) of the sensor magnet SMa seated on a sensor magnet supporting member Yka3 in a prism module 692d is exposed to outside.

Particularly, it is illustrated that a right surface and a lower surface of the sensor magnet SMa contact the sensor magnet supporting member Yka3 and are not exposed to outside, and the left surface and an upper surface of the sensor magnet SMa is exposed to outside.

According to this, the magnetic field is shielded in the right direction and the lower direction of the sensor magnet SMa, and the magnetic field in the upper direction and the left direction becomes greater, and consequently, the strength of the magnetic field around the Hall sensor HSa becomes greater.

Meanwhile, similar to the case shown in FIG. 13B, in the case that the sensor magnet supporting member Yka3 contacts the yoke Yka, the sensor magnet supporting member Yka3 and the yoke Yka may be formed with the same material. Accordingly, the sensor magnet supporting member Yka3 and the yoke Yka may be formed simultaneously, and there is an advantage that the manufacturing process becomes simplified.

In addition, owing to the contact between the sensor magnet supporting member Yka3 and the yoke Yka, the magnetic field shielding effect by the sensor magnet supporting member Yka3 may be more improved.

Figure 13D:
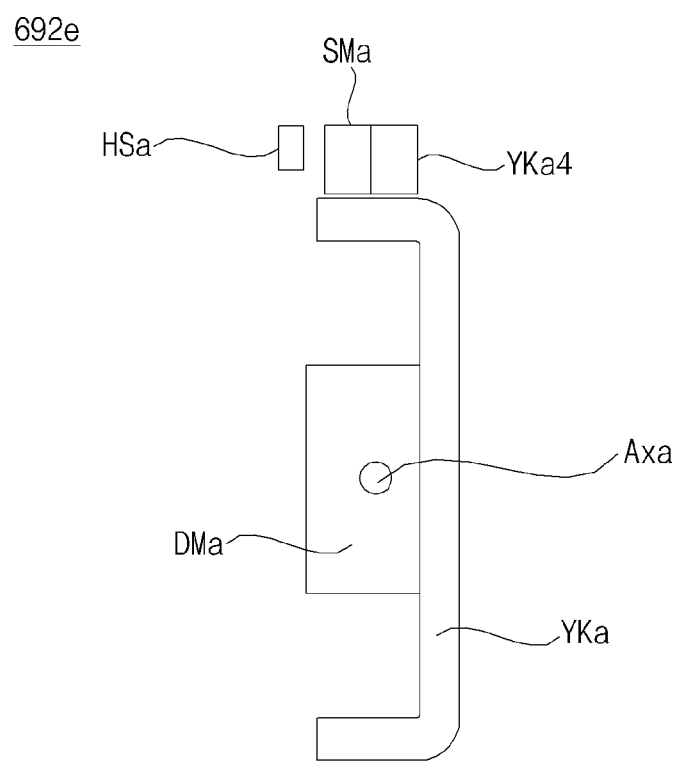

Next, similar to the prism module 692b of FIG. 13A, a prism module 692e of FIG. 13D illustrates that a right surface of the sensor magnet SMa contacts a sensor magnet supporting member Yka4 and is not exposed to outside.

Meanwhile, different from FIG. 13A, in the prism module 692e of FIG. 13D, the sensor magnet supporting member Yka4 and the yoke Yka are not spaced apart, but contact. Accordingly, a lower surface of the sensor magnet SMa contacts the yoke Yka and may not be exposed to outside.

Consequently, a first surface (left surface) and a second surface (upper surface) may be exposed to outside.

According to this, the magnetic field is shielded in the right direction and the lower direction of the sensor magnet SMa, and the magnetic field in the upper direction and the left direction of the sensor magnet SMa becomes greater, and consequently, the strength of the magnetic field around the Hall sensor HSa becomes greater.

Meanwhile, similar to the case shown in FIG. 13B, in the case that the sensor magnet supporting member Yka4 contacts the yoke Yka, the sensor magnet supporting member Yka4 and the yoke Yka may be formed with the same material. Accordingly, the sensor magnet supporting member Yka4 and the yoke Yka may be formed simultaneously, and there is an advantage that the manufacturing process becomes simplified.

In addition, owing to the contact between the sensor magnet supporting member Yka4 and the yoke Yka, the magnetic field shielding effect by the sensor magnet supporting member Yka3 may be more improved.

Figure 14:
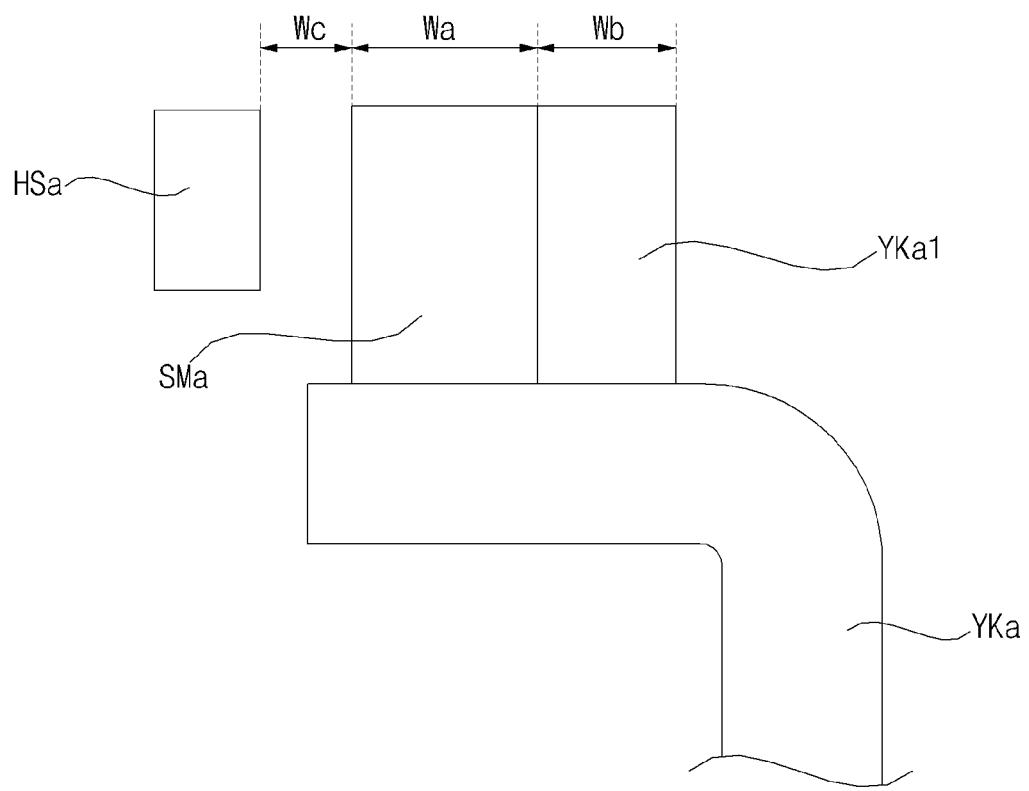

FIG. 14 is a diagram referred for describing the sensor magnet supporting member Yka1 and the sensor magnet SMa in the prism module 692e of FIG. 13D.

Referring to the drawing, it is preferable that a spacing Wc between the sensor magnet SMa and the Hall sensor HSa is smaller than a width Wa of the sensor magnet SMa.

As the spacing Wc between the sensor magnet SMa and the Hall sensor HSa becomes smaller, the magnetic field strength around the Hall sensor HSa becomes greater.

Next, it is preferable that the width Wa of the sensor magnet SMa is greater than a width Wb of the sensor magnet supporting member Yka1.

Since the sensor magnet supporting member Yka1 is for magnetic field shielding, it is preferable that a width Wb of the sensor magnet supporting member Yka1 is smaller than the width Wa of the sensor magnet SMa.

According to this, the magnetic field is shielded in the right direction and the lower direction of the sensor magnet SMa, and the strength of the magnetic field around the Hall sensor HSa becomes greater.

Meanwhile, a ratio between the spacing Wc between the sensor magnet SMa and the Hall sensor HSa, the width Wa of the sensor magnet SMa and the width Wb of the sensor magnet supporting member Yka1 may be about 1:2:0.5 to 2.

That is, a ratio between the spacing Wc between the sensor magnet SMa and the Hall sensor HSa, the width Wa of the sensor magnet SMa and the width Wb of the sensor magnet supporting member Yka1 may be about 1:2:0.5 to 1:2:2. According to this, the strength of the magnetic field around the Hall sensor HSa becomes greater, and sensing accuracy is improved. And a size of the sensor magnet SMa may be designed in small size, and a manufacturing cost may be reduced.

Meanwhile, the prism module 692 described in FIG. 6 to FIG. 14 may be adopted to various electronic devices such as the mobile terminal 100 of FIG. 2, a vehicle, a TV, a drone, a robot and a robot cleaner.

In addition, the preferred embodiment of the present disclosure is described so far, but the present disclosure is not limited to a specific embodiment described above. And various modifications of the present disclosure is also available to those skilled in the art without departing from the concept of the present disclosure claimed in the claims, and such various modifications should not be individually understood from the inventive concept or prospect of the present disclosure.

What is claimed is:

1. A prism module, comprising:
   a prism holder for fixing a prism on a first surface;
   a yoke coupled to a second surface of the prism holder;
   a driving magnet seated on the yoke;
   a sensor magnet disposed on the yoke;
   a Hall sensor disposed with being spaced apart from the sensor magnet; and
   a sensor magnet supporting member to which the sensor magnet is attached,
   wherein the sensor magnet is disposed between the Hall sensor and the sensor magnet support member.

2. The prism module of claim 1, wherein the sensor magnet supporting member and the yoke contact with each other.

3. The prism module of claim 1, wherein a first surface of the sensor magnet seated on the sensor magnet supporting member is exposed outside.

4. The prism module of claim 1, wherein a first surface and a second surface of the sensor magnet seated on the sensor magnet supporting member is exposed outside.

5. The prism module of claim 4, wherein the sensor magnet supporting member and the sensor magnet contact the yoke.

6. The prism module of claim 1, wherein a spacing between the sensor magnet and the Hall sensor is smaller than a width of the sensor magnet.

7. The prism module of claim 1, wherein a width of the sensor magnet is greater than a width of the sensor magnet supporting member.

8. A camera, comprising:
   an image sensor;
   a lens structure including at least one lens, wherein the lens is driven for variable focus;
   a first prism module including a first prism, and for changing an angle of the first prism in a first direction; and
   a second prism module including a second prism, and for changing an angle of the second prism in a second direction,
   wherein the first prism and the second prism are orthogonally disposed, and
   wherein the first prism or the second prism includes:
   a prism holder for fixing a prism on a first surface;
   a yoke coupled to a second surface of the prism holder;
   a driving magnet seated on the yoke;
   a sensor magnet disposed on the yoke;
   a Hall sensor disposed with being spaced apart from the sensor magnet; and
   a sensor magnet supporting member to which the sensor magnet is attached,
   wherein the sensor magnet is disposed between the Hall sensor and the sensor magnet support member.

9. The camera of claim 8, wherein the sensor magnet supporting member and the yoke contact with each other.

10. The camera of claim 8, wherein a first surface of the sensor magnet seated on the sensor magnet supporting member is exposed outside.

11. The camera of claim 8, wherein a first surface and a second surface of the sensor magnet seated on the sensor magnet supporting member is exposed outside.

12. The camera of claim 11, wherein the sensor magnet supporting member and the sensor magnet contact the yoke.

13. The camera of claim 8, wherein a spacing between the sensor magnet and the Hall sensor is smaller than a width of the sensor magnet.

14. The camera of claim 8, wherein a width of the sensor magnet is greater than a width of the sensor magnet supporting member.

15. An image display apparatus including a camera, wherein the camera comprises:
   an image sensor;
   a lens structure including at least one lens, wherein the lens is driven for variable focus;
   a first prism module including a first prism, and for changing an angle of the first prism in a first direction; and
   a second prism module including a second prism, and for changing an angle of the second prism in a second direction,
   wherein the first prism and the second prism are orthogonally disposed, and
   wherein the first prism or the second prism includes:
   a prism holder for fixing a prism on a first surface;
   a yoke coupled to a second surface of the prism holder;

a driving magnet seated on the yoke;

a sensor magnet disposed on the yoke;

a Hall sensor disposed with being spaced apart from the sensor magnet; and a sensor magnet supporting member to which the sensor magnet is attached, wherein the sensor magnet is disposed between the Hall sensor and the sensor magnet support member.

16. The image display apparatus of claim 15, wherein the sensor magnet supporting member and the yoke contact with each other.

17. The image display apparatus of claim 15, wherein a first surface of the sensor magnet seated on the sensor magnet supporting member is exposed outside.

18. The image display apparatus of claim 15, wherein a first surface and a second surface of the sensor magnet seated on the sensor magnet supporting member is exposed outside.

19. The image display apparatus of claim 15, wherein the sensor magnet supporting member and the sensor magnet contact the yoke.

20. The image display apparatus of claim 15, wherein a spacing between the sensor magnet and the Hall sensor is smaller than a width of the sensor magnet.

* * * * *